(12) United States Patent
Wentink et al.

(10) Patent No.: US 8,743,793 B2
(45) Date of Patent: Jun. 3, 2014

(54) SYSTEMS AND METHODS FOR PROVIDING A SEPARATE CONTENTION WINDOW ALLOWING ALLOCATIONS FOR PENDING UPLINK SDMA TRANSMISSION OPPORTUNITIES

(75) Inventors: Maarten Menzo Wentink, Naavder (NL); Albert van Zelst, Woerden (NL); Geert Arnout Awater, Utrecht (NL); Gregory Steele, Fremont, CA (US); James Gardner, San Ramon, CA (US); Didier Johannes Richard van Nee, De Meern (NL); Vincent K. Jones, IV, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 968 days.

(21) Appl. No.: 12/501,026

(22) Filed: Jul. 10, 2009

(65) Prior Publication Data

US 2010/0008318 A1    Jan. 14, 2010

Related U.S. Application Data

(60) Provisional application No. 61/080,621, filed on Jul. 14, 2008.

(51) Int. Cl.
*H04W 28/04* (2009.01)
(52) U.S. Cl.
USPC .......................................... 370/329; 370/338
(58) Field of Classification Search
USPC ................................. 370/329, 338
See application file for complete search history.

(56) References Cited

U.S. PATENT DOCUMENTS

| | | | |
|---|---|---|---|
| 7,352,718 B1 | 4/2008 | Perahia et al. | |
| 8,243,690 B2 * | 8/2012 | Li et al. | 370/334 |
| 2005/0135295 A1 | 6/2005 | Walton et al. | |
| 2005/0141449 A1 | 6/2005 | Yuang et al. | |
| 2007/0049218 A1 | 3/2007 | Gorokhov et al. | |
| 2007/0097910 A1 | 5/2007 | Ji et al. | |
| 2008/0095091 A1 * | 4/2008 | Surineni et al. | 370/311 |
| 2008/0186945 A1 * | 8/2008 | Ahn | 370/349 |

FOREIGN PATENT DOCUMENTS

| | | |
|---|---|---|
| CN | 1384646 A | 12/2002 |
| JP | 2006246030 A | 9/2006 |
| TW | 200718073 | 5/2007 |
| WO | 2006080352 A1 | 8/2006 |

OTHER PUBLICATIONS

"IEEE Standard for information technology Telecommunications and information, exchange between systems Local and metropolitan area networks Specific requirements Part 11: Wireless LAN Medium Access Control (MAC) and Physical Layer (PHY) Specifications" Jun. 12, 2007, IEEE Standard; [IEEE Standard], IEEE, Piscataway, NJ, USA, pp. 251-312 , XP002555935 ISBN: 978-0-7381-5420-6 the whole document.

(Continued)

*Primary Examiner* — Mark Rinehart
*Assistant Examiner* — Matthew Hopkins
(74) *Attorney, Agent, or Firm* — Eric Ho

(57) ABSTRACT

A method for providing uplink spatial division multiple access (SDMA) transmission opportunities (TXOP) is described. A demarcation indication may be sent to one or more subscriber stations. An SDMA contention window may be started. An allocation indication may be received. Requested uplink SDMA TXOP resources may be allocated according to the allocation indication.

40 Claims, 15 Drawing Sheets

(56) References Cited

OTHER PUBLICATIONS

International Search Report & Written Opinion—PCT/US2009/050385, International Search Authority—European Patent Office—Nov. 30, 2009.
Kuzminskiy A M et al: "Downlink throughput enhancement of IEEE 802.11a/g using SDMA with a multi-antenna access point" Aug. 1, 2006, Signal Processing, Elsevier Science Publishers B.V. Amsterdam, NL, pp. 1896-1910 , XP024997909 ISSN: 0165-1684 [retrieved on Aug. 1, 2006] the whole document.
Taiwan Search Report—TW098123797—TIPO—Nov. 9, 2012.
Zhou S. et al., "An Uplink Medium Access Protocol with SDMA Support for Multiple-Antenna WLANs" Wireless Communications and Networking Conference, 2008. WCNC 2008. IEEE, IEEE, Piscataway, NJ, USA, Mar. 31, 2008, pp. 1809-1814, XP031243907.

\* cited by examiner

SYSTEMS AND METHODS FOR PROVIDING A SEPARATE CONTENTION WINDOW ALLOWING ALLOCATIONS FOR PENDING UPLINK SDMA TRANSMISSION OPPORTUNITIES

RELATED APPLICATIONS

This application claims the benefit of U.S. Provisional Patent Application Ser. No. 61/080,621, titled "Systems and Methods for a Separate Contention Window Allowing Allocations for Pending Uplink SDMA TXOP," which was filed Jul. 14, 2008.

TECHNICAL FIELD

The present disclosure relates generally to wireless communication systems. More specifically, the present disclosure relates to systems and methods for a separate contention window allowing allocations for a pending uplink spatial division multiple access (SDMA) transmission opportunity (TXOP).

BACKGROUND

Wireless communication devices have become smaller and more powerful in order to meet consumer needs and to improve portability and convenience. Consumers have become dependent upon wireless communication devices such as cellular telephones, personal digital assistants (PDAs), laptop computers, and the like. Consumers have come to expect reliable service, expanded areas of coverage, and increased functionality. A wireless communication device may be referred to as a mobile station, a subscriber station, an access terminal, a remote station, a user terminal, a terminal, a subscriber unit, user equipment, etc. The term "subscriber station" will be used herein.

A wireless communication system may provide communication for a number of cells, each of which may be serviced by a base station. A base station may be a fixed station that communicates with mobile stations. A base station may alternatively be referred to as an access point or some other terminology.

A subscriber station may communicate with one or more base stations via transmissions on the uplink and the downlink. The uplink (or reverse link) refers to the communication link from the subscriber station to the base station, and the downlink (or forward link) refers to the communication link from the base station to the subscriber station. A wireless communication system may simultaneously support communication for multiple subscriber stations.

Wireless communication systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, orthogonal frequency division multiple access (OFDMA) systems, and spatial division multiple access (SDMA).

The IEEE 802.11 group is currently looking into standardizing a new and faster version of 802.11, under the name VHT (Very High Throughput). Technologies are being considered in this group which allow for multiple transmissions to occur in parallel without causing a collision, like SDMA and OFDMA.

DETAILED DESCRIPTION

Figure 1:
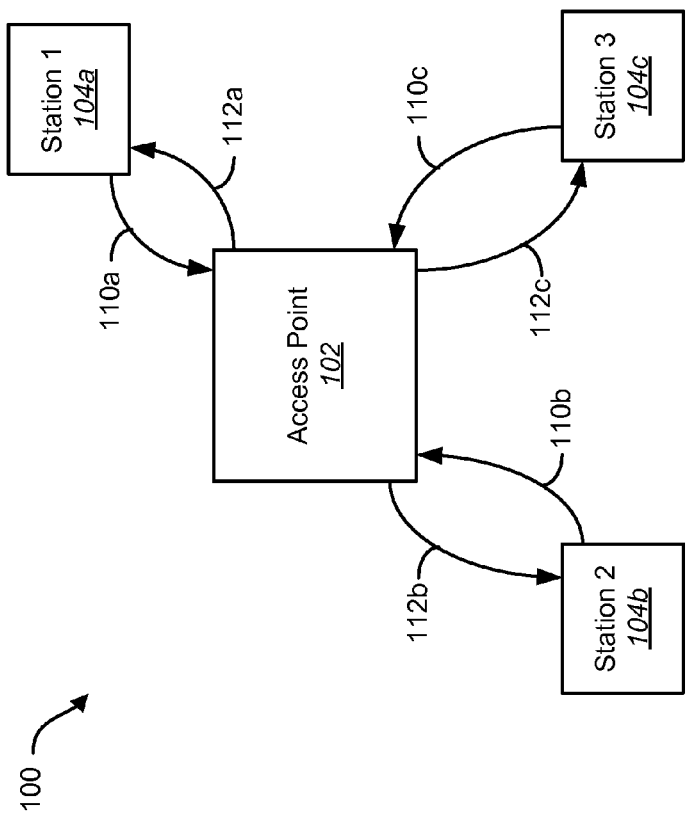
FIG. 1 illustrates a system including an access point in wireless electronic communication with multiple subscriber stations.

A method for providing uplink spatial division multiple access (SDMA) transmission opportunities (TXOP) is described. The method may be implemented by a wireless device. A demarcation indication may be sent to one or more subscriber stations. An SDMA contention window may begin. An allocation indication may be received. Requested uplink SDMA TXOP resources may be allocated according to the allocation indication. Collisions may be handled during the SDMA contention window. An uplink SDMA TXOP may begin after the end of the SDMA contention window.

A block ACK may be sent to the subscriber stations. Feedback may be sent to the subscriber stations after the end of the SDMA contention window. An uplink SDMA TXOP may begin after the feedback has been sent to the subscriber stations. The feedback may include an allocation of an SDMA TXOP. An ACK may be sent after receiving the allocation indication. The wireless device may support an Institute of Electronic and Electrical Engineers (IEEE) 802.11 standard.

A wireless device that is configured for providing uplink spatial division multiple access (SDMA) transmission opportunities (TXOP) is also described. The wireless device may include a processor. The wireless device may also include circuitry coupled to said processor. The circuitry may be configured to send a demarcation indication to one or more subscriber stations. The circuitry may also be configured to begin an SDMA contention window. The circuitry may further be configured to receive an allocation indication. The circuitry may also be configured to allocate requested uplink SDMA TXOP resources according to the allocation indication.

An apparatus that is configured for providing uplink spatial division multiple access (SDMA) transmission opportunities (TXOP) is also described. The apparatus may include means for sending a demarcation indication to one or more subscriber stations. The apparatus may also include means for beginning an SDMA contention window. The apparatus may further include means for receiving an allocation indication. The apparatus may also include means for allocating requested uplink SDMA TXOP resources according to the allocation indication.

A computer-program product for providing uplink spatial division multiple access (SDMA) transmission opportunities (TXOP) is described. The computer-program product may include a computer-readable medium having instructions thereon. The instructions may include code for sending a demarcation indication to one or more subscriber stations. The instructions may also include code for beginning an SDMA contention window. The instructions may further include code for receiving an allocation indication. The instructions may also include code for allocating requested uplink SDMA TXOP resources according to the allocation indication.

A method for providing uplink spatial division multiple access (SDMA) transmission opportunities (TXOP) is also described. An allocation indication may be received. Requested uplink SDMA TXOP resources may be allocated according to the allocation indication.

A wireless device that is configured for providing uplink spatial division multiple access (SDMA) transmission opportunities (TXOP) is described. The wireless device may include a processor. The wireless device may include circuitry coupled to said processor. The circuitry may be configured to receive an allocation indication. The circuitry may also be configured to allocate requested uplink SDMA TXOP resources according to the allocation indication.

An apparatus that is configured for providing uplink spatial division multiple access (SDMA) transmission opportunities (TXOP) is described. The apparatus may include means for receiving an allocation indication. The apparatus may also include means for allocating requested uplink SDMA TXOP resources according to the allocation indication.

A computer-program product for providing uplink spatial division multiple access (SDMA) transmission opportunities (TXOP) is also described. The computer-program product may include a computer-readable medium having instructions thereon. The instructions may include code for receiving an allocation indication. The instructions may also include code for allocating requested uplink SDMA TXOP resources according to the allocation indication.

A method for providing uplink spatial division multiple access (SDMA) transmission opportunities (TXOP) is described. The method may be implemented by a wireless device. An uplink SDMA request (USR) may be received. Requested uplink SDMA TXOP resources may be allocated according to the USR. An ACK frame may be sent in response to the USR frame. An uplink SDMA TXOP may begin when sufficient resources have been allocated. An uplink SDMA TXOP may also begin when sufficient time has expired. An uplink SDMA TXOP may also begin by sending an allocation frame.

An uplink SDMA TXOP may begin by aggregating an allocation frame to the ACK frame. An uplink SDMA TXOP may also begin by sending an allocation frame a short interframe space (SIFS) after sending an ACK frame. The USR frame may be an RTS frame and the ACK frame may be a CTS frame.

A method for providing uplink spatial division multiple access (SDMA) transmission opportunities (TXOP) is also disclosed. The method may be implemented by a wireless device. An uplink SDMA request (USR) may be transmitted. An ACK frame may be received in response to the USR frame. An allocation frame may be received. Uplink data may be transmitted according to the allocation frame. A backoff may be halted when an ACK was received in response to a USR frame. A backoff may be resumed after an uplink SDMA TXOP has occurred. A backoff may also be resumed after a USR frame was transmitted.

The Institute of Electronic and Electrical Engineers (IEEE) 802.11 Working Group aims to prepare formal standards for wireless local area network (WLAN) computer communication in the 2.4 GHz and 5 GHz public spectrum bands.

FIG. 1 illustrates a system 100 including an access point 102 in wireless electronic communication with multiple subscriber stations 104. The access point 102 may be a base station. The subscriber stations 104 may be mobile stations such as mobile phones and wireless networking cards.

The access point 102 may communicate electronically with each of the subscriber stations 104. For example, the access point 102 may send electronic communications to the subscriber stations 104 over a downlink transmission 112. Similarly, the subscriber stations 104 may send electronic communications to the access point 102 over an uplink transmission 110. The subscriber stations 104 may receive transmissions from the access point 102 that are not directed at the specific subscriber station 104. For example, the access point 102 may send a downlink transmission 110 to subscriber station 1 104a that may also be received by subscriber station 2 104b. Similarly, subscriber stations 104 may receive uplink transmissions 110 from other subscriber stations 104 that are not directed at the other subscriber stations 104. For example, subscriber station 2 104b may send an uplink transmission 110 to the access point 102 that may also be received by subscriber station 3 104c.

Multiple subscriber stations 104 may be in electronic communication with a single access point 102 at any given time. As such, the access point 102 may be designed to receive transmissions from more than one subscriber station 104 during the same time frame. Such communications may be referred to as parallel transmissions in the uplink direction 110. The subscriber stations 104 may communicate with the access point 102 using distributed channel access, which is typically based on a random timing to access the channel. One constraint of such communications is that the parallel transmissions in the uplink direction 110 should start at exactly the same time. The time period during which parallel transmission in the uplink direction 110 occurs may be referred to as the SDMA TXOP (Transmission Opportunity). Although SDMA technology is mentioned in the present discussion, it is assumed that the term covers other, similar technologies as well.

Figure 2:
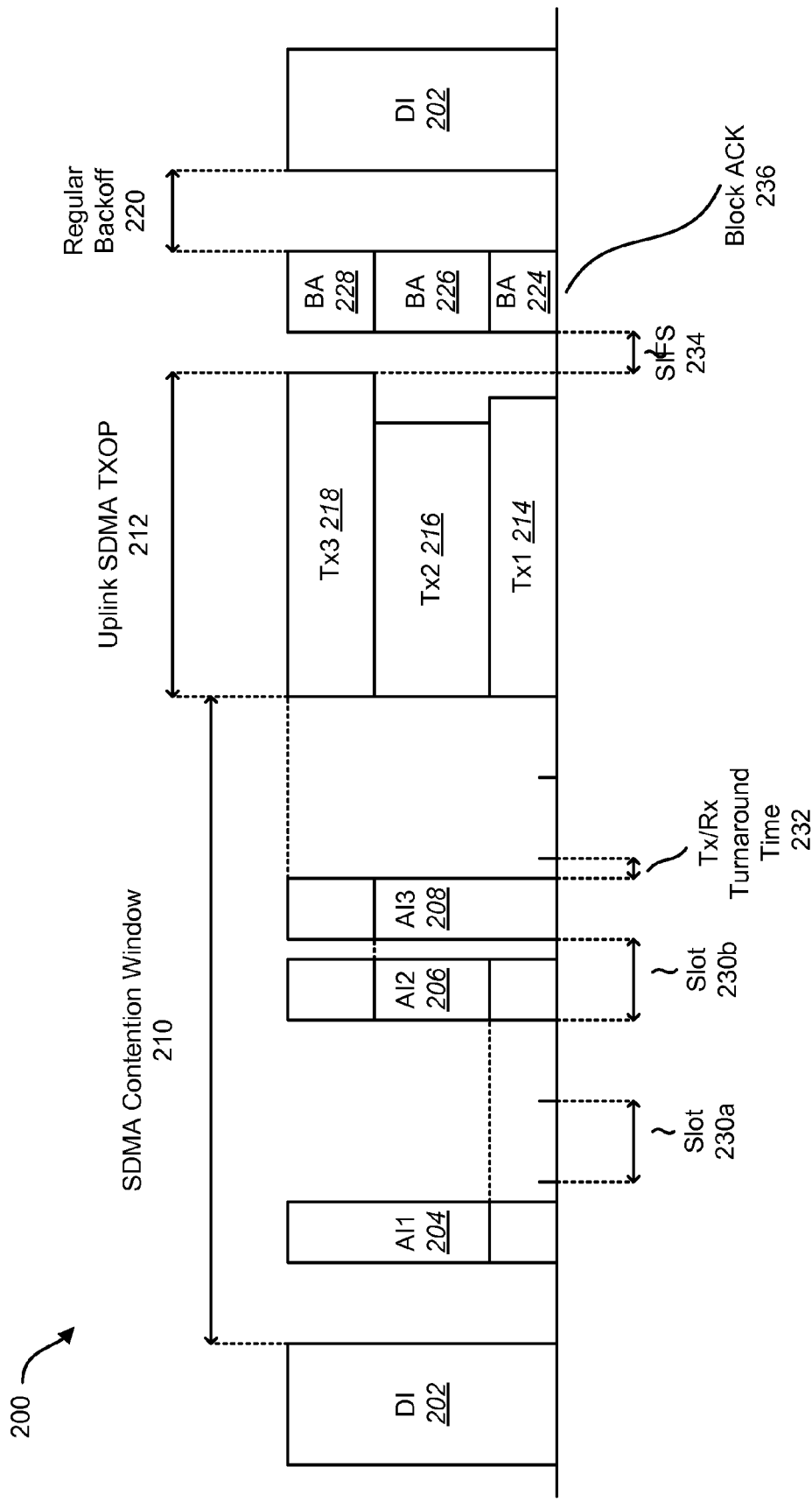
FIG. 2 illustrates a system for transmission schemes between an access point and multiple subscriber stations during an SDMA contention window and an uplink SDMA TXOP where the access point does not provide feedback.

FIG. 2 illustrates a system 200 for transmission schemes between an access point 102 and multiple subscriber stations 104 during an SDMA contention window 210 and an uplink SDMA TXOP 212 where the access point 102 does not provide feedback. The SDMA contention window 210 is a period of time during which allocations can be made for the pending uplink SDMA TXOP 212.

The contention window 210 should be long enough to allow the TXOP 212 to become fully claimed. Short contention windows 210 may lead to TXOPs 212 that are not fully used, because not enough allocation indications were transmitted to claim the full channel. This may have a negative impact on the performance.

The access point 102 may first transmit a demarcation indication (DI) 202. The access point 102 may transmit the demarcation indication 102 on the downlink transmission 112. The demarcation indication 202 may be received by all of the subscriber stations 104 in electronic communication with the access point 102. Alternatively, some of the subscriber stations 104 in electronic communication with the access point 102 may not receive the demarcation indication 202. The demarcation indication 202 is discussed in further detail below in relation to FIG. 11.

After the demarcation indication 202 has been sent, the SDMA contention window 210 for the access point 102 may begin. The SDMA contention window 210 may begin immediately after the demarcation indication 202 has been sent. Alternatively, the SDMA contention window 210 may begin after a preset time delay has elapsed.

During the SDMA contention window 210, subscriber stations 104 can claim parts of the pending SDMA TXOP 212 by transmitting an allocation indication (AI). The SDMA contention window 210 may be divided into slots 230 sufficiently large to contain an allocation indication, possibly an ACK, and a TX to RX turnaround time. For example, if the allocation indication transmission is 4 µs (microseconds) and the turnaround time is estimated at 5 µs (including a 1 µs air propagation delay), the resulting slot time would be 9 µs. If the ACK is 4 µs as well, the slot size becomes twice that at 18 µs. The slot size may be smaller when no allocation indication occurs. The allocation indication may be transmitted over the uplink transmission 110. The access point 102 may receive the allocation indication from a subscriber station 104. A subscriber station 104 may also receive the allocation indications from other subscriber stations 104. A subscriber station 104 may keep track of allocations made by other subscriber stations 104. A subscriber station 104 may avoid making the same allocation as was made by another subscriber station 104. A subscriber station 104 may set its clear channel assessment (CCA) to busy once the subscriber station 104 can no longer make an allocation for the pending uplink SDMA TXOP 212.

The type of access could be any type of random contention based access, including enhanced distributed channel access (EDCA). For EDCA, all slots 230 in the SDMA contention window 210 are considered to be empty slots 230 (i.e., the clear channel assessment (CCA) is not busy), including slots 230 during which an allocation indication is received, until the TXOP 212 has been fully allocated for that subscriber station 104. This is the point at which the CCA becomes busy, and contention is deferred until the next contention window 210. Depending on the subscriber station 104 capabilities, this point may be reached at different stages in the contention window 210 for different subscriber stations 104. In other words, for EDCA the first slots 230 in the contention window 210 will be interpreted as the arbitration inter frame space (AIFS), followed by the actual backoff slots, until the TXOP 212 is fully allocated and the CCA is busy.

In one configuration, the access point 102 may not provide feedback to the subscriber stations 104 during the SDMA contention window 210. In such cases, the contention window 210 may need to be sufficiently large so as to avoid too many collisions between two or more allocation indications. The slot 230 time may be equal to the size of the allocation indication 204, plus a possible processing time and a possible Tx/Rx turnaround time 232. A collision may occur during the SDMA contention window 210 when multiple allocation indications are transmitted at the same time. The access point 102 may be able to receive colliding transmissions. However, most colliding transmissions of allocation indications cannot be decoded by the access point 102.

Collisions between channel allocation indications are a fundamental property of a contention based channel access protocol. In case of a collision, two subscriber stations 104 may be using the same portion of the channel at the same time, which doubles the received power in those colliding subcarriers, and may cause all subcarriers to fail. Therefore, the effect of collisions may be aggravated because all announced transmissions fail as opposed to only the colliding transmissions. Colliding allocation indications may not be decoded by receiving subscriber stations 104, so it may be unknown which part of the channel is being claimed by the colliding allocation frames. In this case, the safe assumption is that the channel is fully occupied, so the CCA is busy for the remaining part of the contention window 210.

A potential fix for this issue is to have the access point 102 transmit a collision signal (or a new demarcation indication 202) in the slot 230 following the collision, to restart the contention window 210 without letting the colliding TXOP actually happen. This improves the efficiency of a collision in a way similar to the way a request-to-send/clear-to-send (RTS/CTS) or CTS-PIFS (Point Coordination Function Inter Frame Spacing) does. The colliding subscriber stations 104 know that they collided because their allocation indication was followed by a collision indication by the access point 102. However, the collision indication may collide with an allocation indication, in which case the colliding TXOP cannot be avoided. Colliding subscriber stations 104 may see a reset signal immediately after transmitting an allocation indication. The colliding subscriber stations 104 may interpret the reset signal as a collision with respect to selecting a new backoff.

An alternative to a collision indication is a channel access grant indication from the access point 102. The access point 102 may grant access to all subscriber stations 104 that the access point 102 thinks did not cause a collision. This can also be used when there are many more allocation indications than possible allocations in the uplink SDMA TXOP 212. For instance, there may be 64 possible allocation indications and only 8 spatial streams available for SDMA. In that case, the access point 102 can do the mapping from the allocation indication to the SDMA stream, which prevents collisions as long as no two subscriber stations 104 use the same allocation indications. If the access point 102 is not involved, groups of 8 different allocation indications may be mapped onto the same spatial stream, which increases the probability of collisions.

A grant indication from the access point 102 may also be used to time the beginning of the TXOP 212. In this case, the contention window 210 no longer needs to have a fixed length. However, it may be useful to protect the transmission of the grant indication.

In cases where the access point 102 does not provide feedback to the subscriber stations 104 during the contention window 210, the allocation indication for a subscriber station 104 should indicate specifically which part of the uplink SDMA TXOP 212 is requested. It is not sufficient to just indicate how much of the uplink SDMA TXOP 212 is needed. Each subscriber station 104 may monitor the allocation indications for the pending uplink SDMA TXOP 212. Each subscriber station 104 may adapt intended allocation indications based on the current allocation of the pending uplink SDMA TXOP 212.

A collision may also occur when multiple subscriber stations 104 send allocation indications requesting the same part of the uplink SDMA TXOP 212. In cases where the access point 102 does not provide feedback to the subscriber stations 104 during the contention window 210, any collision during the uplink SDMA TXOP 212 may potentially destroy all other transmissions in the uplink SDMA TXOP 212. If the allocation indications are designed such that the access point 102 can observe collisions between allocation indications, the access point 102 may respond to a detected collision by restarting the contention window 210. Alternatively, the access point 102 may respond to a detected collision by reassigning a colliding request to another portion of the uplink SDMA TXOP 212. The access point 102 may also respond to a detected collision by sending a collision signal which prompts colliding subscriber stations 104 to contend again.

After receiving an allocation indication during the SDMA contention window 210, a preset Tx/Rx turnaround time 232 may be needed before the subscriber station 104 that transmitted the allocation indication can receive additional allocation indications. An allocation indication may be received during a slot 230 time frame. One or more empty slots 230 may occur between received allocation indications. As shown in FIG. 2, two empty slots 230 pass after allocation indication 1 (AI1) 204 is received by the access point 102 before allocation indication 2 (AI2) 206 is transmitted. One or more empty slots 230 may not be necessary in between received allocation indications. As shown in FIG. 2, no empty slots 230 pass after allocation indication 2 206 is received by the access point 102 before allocation indication 3 (AI3) 208 is received by the access point 102.

The SDMA contention window 210 may end once a predetermined amount of time has passed. Alternatively, the SDMA contention window 210 may end once all of the uplink SDMA TXOP 212 has been allocated to subscriber stations 104. Alternatively still, the SDMA contention window 210 may end once a specific number of empty slots 230 have occurred. As discussed above, the SDMA contention window 210 may also end if a collision has occurred and the access point 102 detects the collision. Once the SDMA contention window 210 has ended, the uplink SDMA TXOP 212 may start. The uplink SDMA TXOP 212 may start at a fixed offset after a transmission by the access point 102. For example, the uplink SDMA TXOP 212 may start a fixed time after the demarcation indication 202 is sent. Alternatively, the uplink SDMA TXOP 212 may start after the access point 102 has sent a transmission at the end of the SDMA contention window 210. The subscriber stations 104 may then transmit 214, 216, 218 data over the previously allocated parts of the uplink SDMA TXOP 212.

The SDMA TXOP 212 may include staggered TXOPs 214, 216, 218 that take different amounts of time. The start times of the staggered transmissions should be synchronized. It may also be desirable to have end times that are more or less the same. For example, it may be desirable to have end times that are approximately the same. The access point 102 may set a target length of the SDMA TXOP 212, based upon which subscriber stations 104 may vary their channel allocations such that the time is filled up. The combination of the intended subcarrier rate and the data volume may be used to determine the amount of channel allocation needed.

When a subscriber station 104 receives an allocation indication, the subscriber station 104 may be prohibited from claiming the same portion of the channel during the same contention window 210. If a subscriber station 104 cannot change the channel allocation on the fly, the clear channel assessment (CCA) may become busy even if just a small part of the intended allocation gets allocated by another subscriber station 104. A more sophisticated subscriber station 104 may make quick allocation changes, and therefore the subscriber station 104 will have more options to transmit.

The indicated channel allocation may be specified in terms of spatial streams (SDMA), or subcarriers (OFDMA), or a combination thereof. The allocation indication may not need a basic service set identification (BSSID), because the channel allocation is not related to the BSSID but to all the subscriber station 104 contenders in the spatial area around the subscriber station 104. Overlapping networks should respect allocations made for the other network, otherwise collisions may occur. However, contention windows 210 may not overlap because demarcation indications 202 are not transmitted at the same time.

An access point 102 may only claim the full channel, because simultaneous transmission and reception is not possible.

SDCA (Staggered Distributed Channel Access) introduces some extra overhead relative to enhanced distributed channel access (EDCA), because an EDCA contention window is usually equal to the shortest backoff in the system, while the contention window in SDCA is fixed, potentially wasting several slots. However, the contention/allocation window should still be short relative to the average length of a TXOP, so the additional overhead may be small. Also, staggered TXOPs are likely to be longer.

SDCA is not fully backward compatible with EDCA, but the two can be used together. The allocation frames (if they can be received by legacy devices) cause the legacy device to start a new arbitration inter frame space (AIFS), while SDCA devices continue to count down backoff. EDCA stations continue to count down backoff when the CCA may have become busy for SDCA stations. The access point 102 may broadcast an indicative allocation fraction based on the number of active subscriber stations 104. Subscriber stations 104 may use this fraction to determine their channel allocation.

After the uplink SDMA TXOP 212 has ended, the access point 102 may idle for a short inter-frame space (SIFS) 234. The access point 102 may then transmit a block acknowledge (Block ACK) 236 to multiple subscriber stations at once using an SDMA TXOP. The block ACK 236 may include ACKs 224, 226, 228 for the subscriber stations 104. The demarcation indication 202 may then be again transmitted after a regular backoff 220, so that multiple SDMA networks may overlap without breaking down and so that SDMA contention based access can be mixed with legacy devices.

Figure 3:
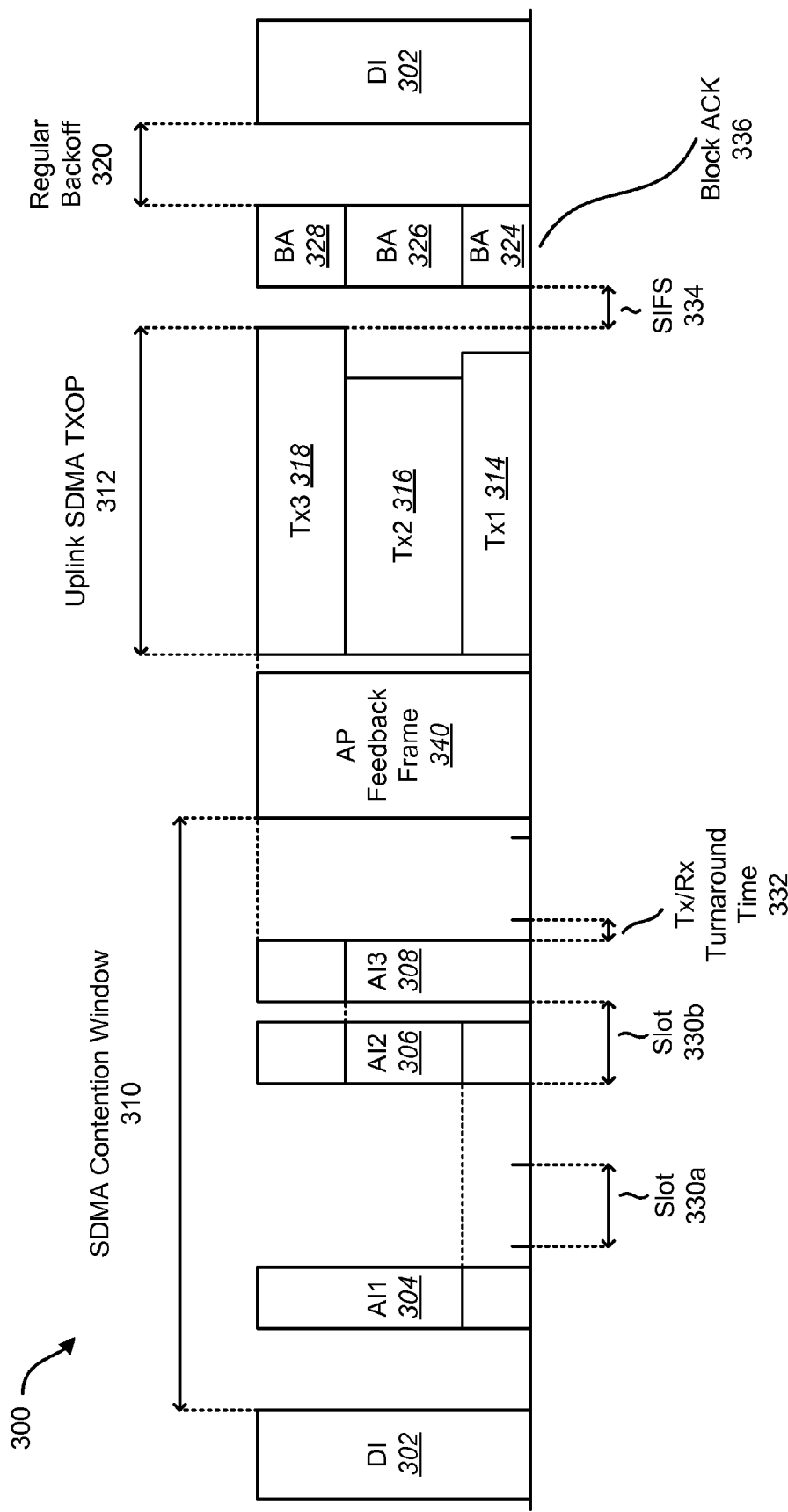
FIG. 3 illustrates a system for transmission schemes between an access point and multiple subscriber stations during an SDMA contention window and an uplink SDMA TXOP where the access point provides feedback to the subscriber stations at the end of the SDMA contention window.

FIG. 3 illustrates a system 300 for transmission schemes between an access point 102 and multiple subscriber stations 104 during an SDMA contention window 310 and an uplink SDMA TXOP 312 where the access point provides feedback 340 to the subscriber stations 104 at the end of the SDMA contention window 310. The access point 102 may transmit a demarcation indication 302 to the subscriber stations 104. The size of the contention window 310 might be announced in the demarcation indication 302. The access point 102 may base these numbers on the number of currently active subscriber station 104 contenders.

After the demarcation indication 302 has been sent, the SDMA contention window 310 may start. The access point 102 may receive a first allocation indication, AI1 304, from subscriber station 1 104a. A preset Tx/Rx turnaround time 332 may expire before the access point 102 can receive additional allocation indications. One or more empty slots 330 may occur between received allocation indications. The access point 102 may then receive a second allocation indication, AI2 306, from subscriber station 2 104b. After the Tx/Rx turnaround time 332, the access point 102 may immediately receive a third allocation indication, AI3 308, from subscriber station 3 104c. The SDMA contention window 310 may then end.

One drawback of staggered distributed channel access (SDCA) without feedback from the access point 102 is the fact that the allocation indications should be received by all contending subscriber stations 104 in the network. If a contending subscriber station 104 does not properly receive an allocation indication, it will miss the pending TXOP 312. Short contention windows 310 are better to this respect, because the demarcation indication 302 has a resetting effect. But this is at odds with the previous issue of filling up the TXOP 312. This issue is mitigated when the access point 102 sends out an allocation grant prior to the TXOP 312.

The access point 102 may send an allocation grant in the form of an access point feedback frame 340 at the end of the SDMA contention window 310 that announces the scheduled contents of the uplink SDMA TXOP 312 so that collisions during the uplink SDMA TXOP 312 are avoided. The SDMA contention window 310 may thus be smaller, at the cost of an extra access point feedback frame 340. Avoiding collisions during the uplink SDMA TXOP 312 may be valuable since an uplink SDMA TXOP 312 may be longer than a non-SDMA TXOP, such that the cost of a collision is higher. Avoiding collisions during the uplink SDMA TXOP 312 may also be valuable because a partial collision during the uplink SDMA TXOP 312 may cause all transmissions during the uplink SDMA TXOP 312 to fail.

Because the access point 102 provides the access point feedback frame 340, the allocation indications may only indicate the requested amount of resources needed during the uplink SDMA TXOP 312 and not the specific part of the uplink SDMA TXOP 312 requested. The access point 102 may then assign the actual allocation of resources to the subscriber stations 104. Because the access point 102 allocates all of the uplink SDMA TXOP 312 resources, only the access point 102 should receive the allocation indications, and not each of the subscriber stations 104. This may improve the reliability of the system 100. The structure of the allocation indication may allow colliding transmissions to be received by the access point 102 under certain circumstances. If the access point 102 received colliding requests, the access point 102 may assign different portions of the uplink SDMA TXOP 312 to the subscriber stations 104 whose allocation indications collided.

The uplink SDMA TXOP 312 allocation may not include colliding requests. The requesting subscriber stations 104 may have to wait until the next SDMA contention window 310 to retry failed requests for allocation of uplink SDMA TXOP 312 resources. Requests that exceeded the available uplink SDMA TXOP 312 capacity may not appear in the access point feedback frame 340. Requests that do not appear in the access point feedback frame 340 may be interpreted as a collision by the requesting subscriber station 104 and should be sent again in the next SDMA contention window 310. The start of the uplink SDMA TXOP 312 may be timed off of the demarcation indication 302 or the access point feedback frame 340.

Once the SDMA contention window 310 has ended and the access point feedback frame 340 has been sent, the uplink SDMA TXOP 312 may start. The subscriber stations 104 may then transmit 314, 316, 318 data over the previously allocated parts of the uplink SDMA TXOP 312. After the uplink SDMA TXOP 312 has ended, the access point 102 may idle for a SIFS 334. The access point 102 may then transmit a block ACK 336 to multiple subscriber stations 104 at once using an SDMA TXOP. The block ACK 336 may include ACKs 324, 326, 328 for the subscriber stations 104. The demarcation indication 302 may then be again transmitted after a regular backoff 320.

Figure 4:
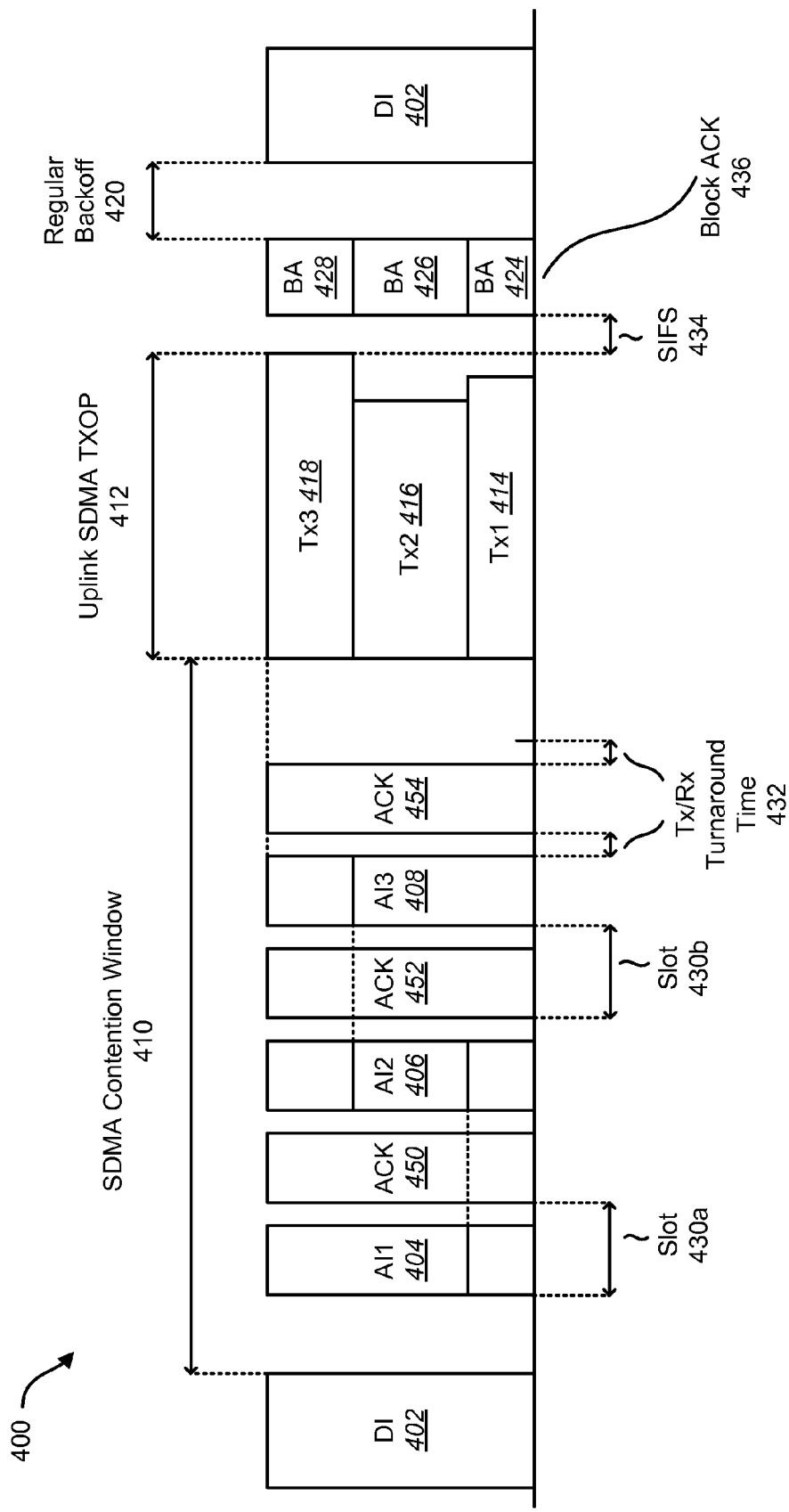
FIG. 4 illustrates a system for transmission schemes between an access point and multiple subscriber stations during an SDMA contention window and an uplink SDMA TXOP where the access point provides feedback to the subscriber stations after each allocation indication.

FIG. 4 illustrates a system 400 for transmission schemes between an access point 102 and multiple subscriber stations 104 during an SDMA contention window 410 and an uplink SDMA TXOP 412 where the access point 102 provides feedback to the subscriber stations 104 after each allocation indication. The access point 102 may transmit a demarcation indication 402 to the subscriber stations 104. After the demarcation indication 402 has been sent, the SDMA contention window 410 may start. The access point 102 may receive a first allocation indication, AI1 404, from subscriber station 1 104a. The access point 102 may wait a preset Tx/Rx turnaround time 432 before sending feedback to the subscriber station 104. The time spent receiving an allocation indication along with the Tx/Rx turnaround time 432 may be a slot 430. The feedback may be in the form of an ACK 450 that indicates that the allocation indication 404 has been received. The ACK 450 may include a summary of the latest uplink SDMA TXOP 412 allocation. The time spent sending the ACK 450 along with the Tx/Rx turnaround time 432 may be a slot 430. Thus, the access point 102 can signal the SDMA TXOP 412 allocation while the allocation process is still ongoing. Because getting further into the SDMA contention window 410 results in a smaller remaining part of the uplink SDMA TXOP 412, it is important that the access point 102 can recognize colliding requests, as the contention for the smaller uplink part of the SDMA TXOP 412 will be increased.

Allocation indications may not be transmitted every second slot because the second slot is designated for an ACK from the access point 102. Allocation indications may not be transmitted during the slot after an allocation indication was transmitted because the slot is designated for the ACK from the access point 102.

The allocation indication may indicate the requested allocation of uplink SDMA TXOP 412 resources or only the amount of resources needed. The ACK 450 may then contain the actual allocation. The contending subscriber stations 104 may change the intended allocations of the uplink SDMA TXOP 412 during the SDMA contention window 410 if it is observed that the intended allocation has become occupied by another subscriber station 104. However, if the access point 102 decides the actual allocation, the allocation indication may only contain the amount of resources needed. The access point 102 may use the ACK 450 to truncate the SDMA contention window 410 when the uplink SDMA TXOP 412 has been fully allocated. Thus, the start of the uplink SDMA TXOP 412 may be timed off of the truncating ACK 450. If a collision does occur, the subscriber stations 104 that sent colliding requests may retry the requests as part of the same SDMA contention window 410. This may lead to a better utilization of the uplink SDMA TXOP 412.

Based on the method of FIG. 4, it is possible to create a channel access mechanism with the same statistical properties as enhanced distributed channel access (EDCA), by interpreting the allocation indication as a request-to-send (RTS) frame and the ACK 450 as a clear-to-send (CTS) frame. The actual data transmission following the CTS may be deferred until the uplink SDMA TXOP 412. A demarcation indication 402 may not be required in this case. The AI/ACK exchange is interpreted as a backoff interruption, which means that an arbitration-inter-frame-space (AIFS) is started after each received AI/ACK exchange. The uplink SDMA TXOP 412 itself may not be interpreted as a backoff interruption, but also not as an empty slot 430. When an ACK 450 is not received, the regular retransmission procedure is started.

If the uplink SDMA TXOP 412 has been fully allocated but the contention window 410 has not yet ended, the access point 102 may have several options. The access point 102 may continue to acknowledge successfully received allocation indications from subscriber stations 104. In this case, the uplink SDMA TXOP 412 may fail but the access point 102 can optimize the size of the contention window 410.

Alternatively, the access point 102 may not acknowledge successfully received allocation indications, causing the sender of the allocation indication to assume a collision. In this case, the size of the SDMA contention window 410 may match the size of the average operating contention window.

Alternatively, the access point 102 may truncate the uplink SDMA TXOP 412 by sending a truncation indication to the subscriber stations 104. The access point 102 may also truncate the uplink SDMA TXOP 412 when the SDMA contention window 410 becomes too long and starts to cause unwanted latency for pending allocated transmissions.

Alternatively, the access point 102 may acknowledge additional allocation requests by allocating the requests to a further uplink SDMA TXOP 412. However, if the contention window 410 is too long, this may lead to more allocations being delayed to further uplink SDMA TXOPs 412 in the future.

The above described method may be referred to as RTS/CTS with deferred TXOP. One advantage over RTS/CTS is that the AI/ACK exchange consumes less time because the allocation indication and the ACK transmission turnaround times may be shorter when the allocation indication and the ACK transmission are generated closer to the PHY layer. In cases of overlapping basic service sets (OBSS), wherein geographically close WLANs share a radio channel, the access point 102 may provide network allocation vector (NAV) protection but the subscriber stations 104 do not have this option because the allocation indication and the ACK may not be MAC frames.

The slot 430 time may be shorter than an AI/ACK exchange, which reduces the overhead of the SDMA contention window 410. For a fixed length SDMA contention window 410, the number of slots 430 during the SDMA contention window 410 varies with the number of AI/ACK exchanges that occur. Thus, more AI/ACK exchanges may lead to less empty slots 430.

One or more empty slots 430 may occur between sending an ACK and receiving additional allocation indications. The access point 102 may then receive a second allocation indication, AI2 406, from subscriber station 2 104b. After the Tx/Rx turnaround time 432, the access point 102 may send an ACK 452. The access point 102 may receive a third allocation indication, AI3 408, from subscriber station 3 104c. The access point 102 may send an ACK 454. The SDMA contention window 410 may then end.

The subscriber stations 104 may then transmit 414, 416, 418 data over the previously allocated parts of the uplink SDMA TXOP 412. After the uplink SDMA TXOP 412 has ended, the access point 102 may idle for a SIFS 434. The access point 102 may then transmit a block ACK 436 to multiple subscriber stations 104 at once using an SDMA TXOP. The block ACK 436 may include ACKs 424, 426, 428 for the subscriber stations 104. The demarcation indication 402 may then be again transmitted after a regular backoff 420, so that multiple SDMA networks may overlap without breaking down and so that SDMA contention based access can be mixed with legacy devices.

Figure 5:
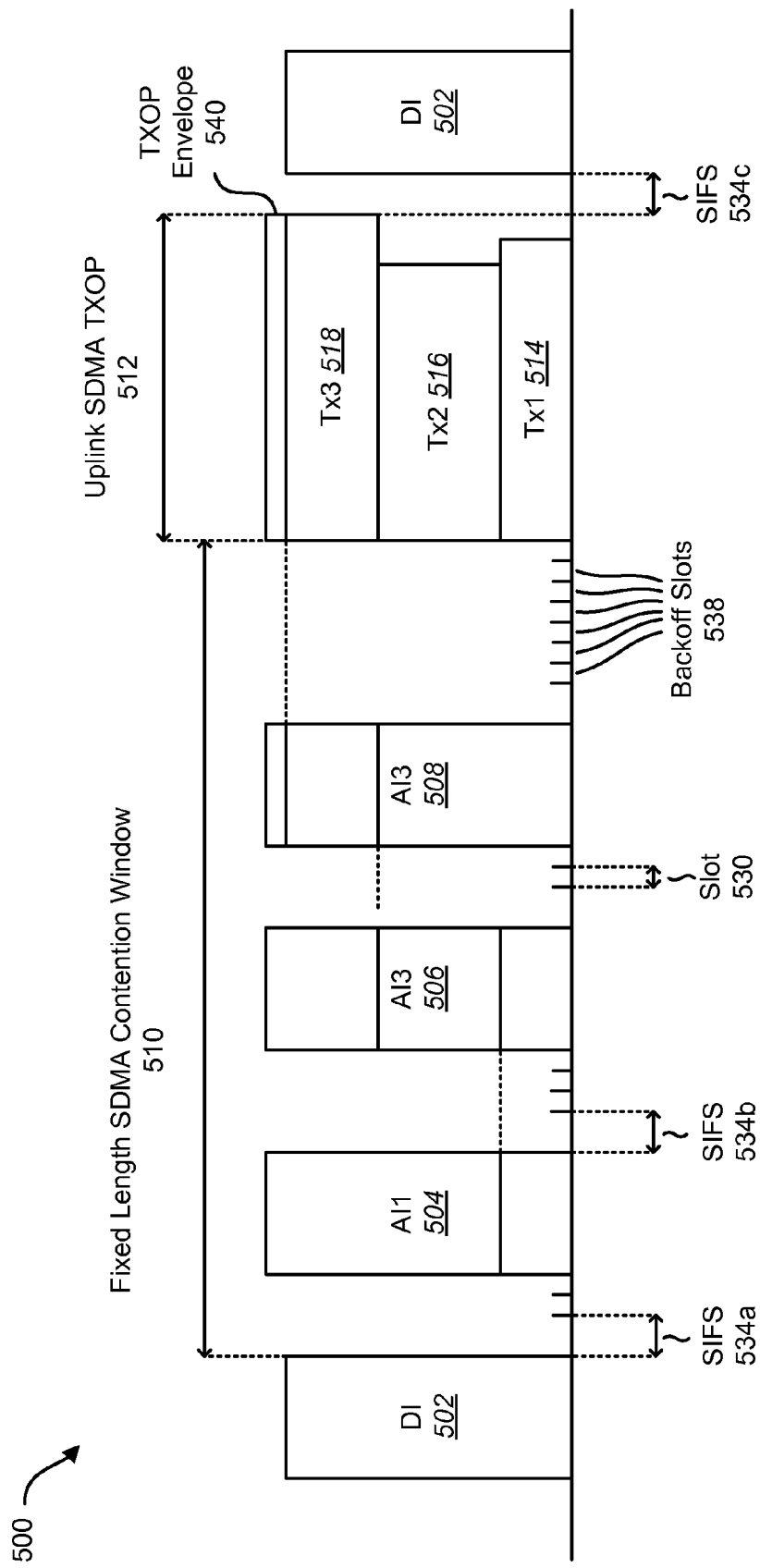
FIG. 5 illustrates a system for transmission schemes between an access point and multiple subscriber stations during a fixed length SDMA contention window and an uplink SDMA TXOP.

FIG. 5 illustrates a system 500 for transmission schemes between an access point 102 and multiple subscriber stations 104 during a fixed length SDMA contention window 510 and an uplink SDMA TXOP 512. The access point 102 may transmit a demarcation indication 502 to the subscriber stations 104. After the demarcation indication 502 has been sent, the SDMA contention window 510 may start. At the beginning of a fixed length SDMA contention window 510, the access point 102 may idle for a SIFS 534. The access point 102 may receive a first allocation indication, AI1 504, from subscriber station 1 104a.

The slot 530 during which a channel allocation indication is received may be considered empty with respect to the backoff by a subscriber station 104 if another allocation can still be made by that subscriber station 104. If no further allocation can be made by the subscriber station 104, the CCA for that slot 530 and all remaining slots 530 in the contention window 510 may be assumed to be busy with respect to the backoff. The backoff may continue after the pending TXOP in the usual way by starting with AIFS. The remaining portions of the channel can be claimed during further slots 530 in the fixed length SDMA contention window 510 by subscriber stations 104 which can still make an allocation. If an allocation indication is not interpreted as an empty slot 530, contending subscriber stations 104 would start a new AIFS after each allocation indication, which would cause a change in the distribution of TXOPs over the subscriber stations 104. The channel access mechanism would still work in this case, but the channel access parameters may have to be changed to achieve fair channel access for each subscriber station 104.

The access point 102 may receive allocations 504, 506, 508 from the subscriber stations 104 during different slots 530. The time spent receiving an allocation indication may be longer than the slot 530 time. After receiving an allocation indication, the access point 102 may idle for a SIFS 534 before receiving additional allocation indications. Before the end of the fixed length SDMA contention window 510, one or more backoff slots 538 may occur.

If the AI+SIFS time exceeds the slot 530 time, then the number of backoff slots 538 in a contention window 510 may vary with the number of allocation indications that occur during the contention window 510 (because the length of the contention window 510 is fixed in terms of time, not in number of backoff slots 538). A workaround is to make the slot 530 size equal to AI+SIFS, but this may imply a long slot 530 time. Another option might be to time the start of the next TXOP off of an allocation indication transmission as opposed to a demarcation indication 502 transmission. However, this may cause timing issues and introduce issues with hidden nodes (because allocation indications are transmitted by a subscriber station 104 and not an access point 102). The air propagation delay may be longer because the access point 102 is more or less the center of the network, but a subscriber station 104 does not need to be. A third option is to set the contention window 510 length in a number of slots 530, knowing that slots 530 may have a different length based on whether an allocation indication was transmitted or not. For the latter case, the time counted for an allocation indication transmission may exceed the actual time consumed by the allocation indication transmission, because the allocation indication transmission may not occur exactly at the beginning of the slot 530 (depending on air propagation delay, media access control (MAC) delay, etc.). Another way to phrase the last option is that for each allocation indication which occurs during the contention window 510, the contention window 510 is extended by x μs (x≥AI+SIFS−slot time).

The subscriber stations 104 may then transmit 514, 516, 518 data over the previously allocated parts of the uplink SDMA TXOP 512. After the uplink SDMA TXOP 512 has ended, the access point 102 may idle for a SIFS 534. The access point 102 may transmit a demarcation indication 502 after each TXOP 512. If no transmission starts during the TXOP 512, the access point 102 may transmit a demarcation indication 502 after a point control function (PCF) interframe space (PIFS) idle time. When no TXOP 512 starts for several contention windows 510, the access point 102 may cease demarcation indication 502 transmissions until a TXOP 512 occurs (this is not a staggered (SDMA) transmission because there was no demarcation indication 502 and no allocation indications).

Figure 6:
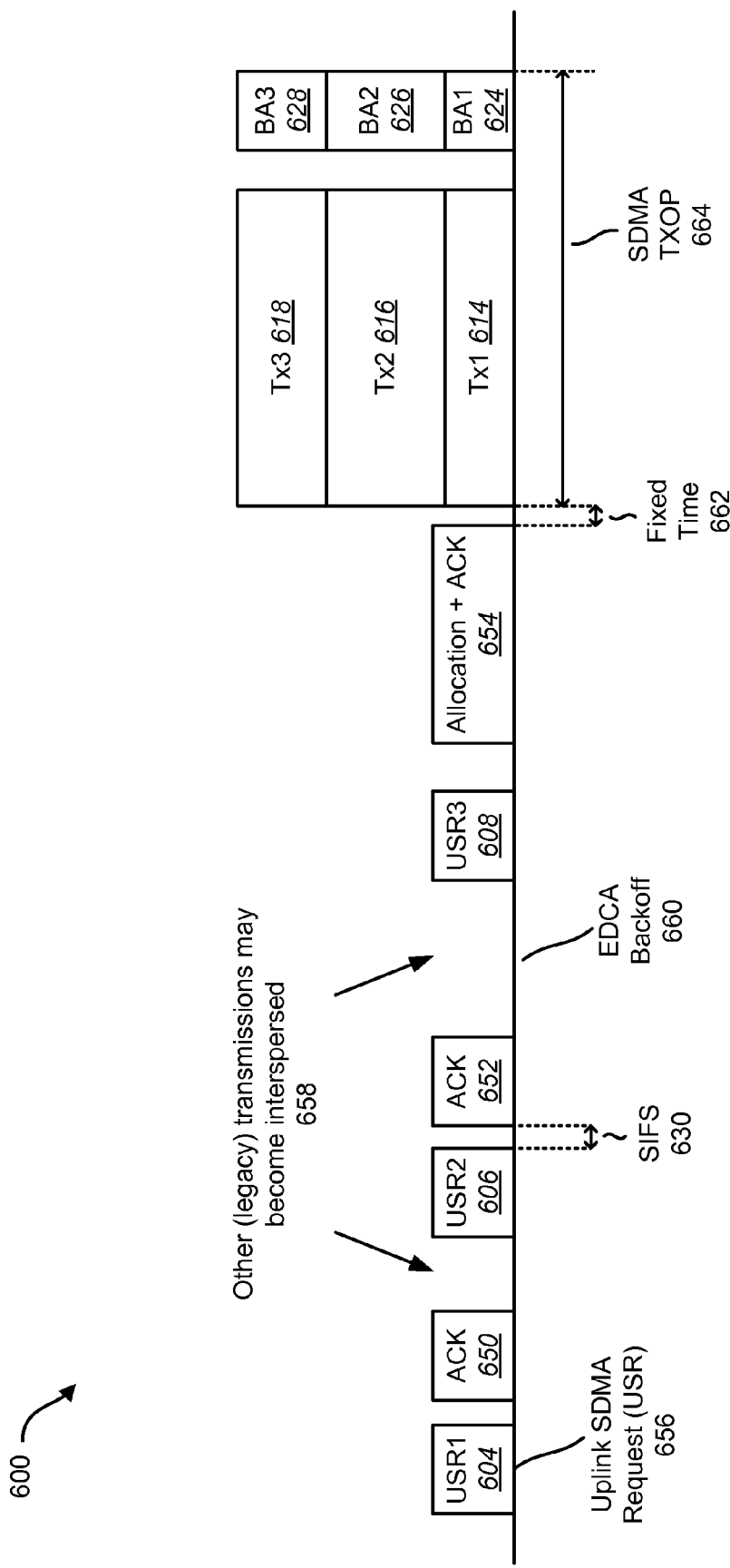
FIG. 6 illustrates a system with an uplink SDMA transmission scheme with enhanced distributed channel access (EDCA)

FIG. 6 illustrates a system 600 with an uplink SDMA transmission scheme with EDCA. Similar to the allocation indication discussed above, the access point 102 may receive an uplink SDMA request (USR) 656 from a subscriber station 104. The USR 656 may use regular EDCA contention. The USR 656 may be a regular MAC protocol data unit (MPDU). The USR 656 may be a new control subtype. The access point 102 may receive a USR1 604 from subscriber station 1 104a. After a SIFS 630, the access point 102 may then transmit an ACK 650 to the subscriber station 104 and register the SDMA request. The USR/ACK exchange may be similar to an RTS/CTS exchange, except that in the USR/ACK exchange, the data transmission does not occur until an SDMA TXOP 664. When compared to regular EDCA, the transmission savings may occur in the SDMA TXOP 664 because transmissions occur in parallel instead of sequentially.

The access point 102 may wait an EDCA backoff 660 before receiving additional USR 656 frames. Thus, after an EDCA backoff 660, the access point 102 may receive a USR2 606 from subscriber station 2 104b. After a SIFS 630, the access point 102 may transmit an ACK 652 for the USR2 606 and may register the SDMA request.

Prior to the uplink SDMA TXOP 664, the access point 102 may transmit an allocation frame 654 that specifies the allocations for the TXOP 664. The allocation frame 654 may be transmitted in response to the final USR 608 and may thus be part of the ACK for the final USR 608. The allocation frame 654 may also be transmitted after a SIFS 630 after the ACK. Alternatively, the allocation frame 654 may be transmitted as broadcast when a final USR 608 does not arrive in time but the SDMA TXOP 664 should not be further postponed. If the SDMA TXOP 664 does not begin (potentially indicating a collision), the access point 102 may retransmit the allocation frame 654. A recovery mechanism may be defined to re-grant access to registered subscriber stations 104 that did not receive the allocation frame 654. The SDMA TXOP 664 may begin a fixed time 662 after the allocation frame 654. The allocation frame 654 may indicate a start time of block ACK (BA) frames 624, 626, 628.

Uplink SDMA may be integrated with legacy EDCA by using regular control frames to place USR 656 frames. The USR 656 frames may then be transmitted using regular EDCA. Other transmissions 658, such as legacy TXOPs, may become interspersed with the USR/ACK frame exchanges.

The access point 102 may keep track of received requests and send an allocation frame 654 when the uplink SDMA TXOP 664 is sufficiently full, or when the uplink SDMA TXOP 664 can no longer be postponed. The allocation frame 654 may be a SIFS 630 response to a USR 656. Alternatively, the allocation frame 654 may be a SIFS 630 continuation to an ACK. The allocation frame 654 may be a group addressed frame when the SDMA TXOP 664 is due but no USR 656 arrives at that time.

When a subscriber station 104 has successfully reserved an SDMA TXOP 664 slot, and the TXOP 664 will consume all of the subscriber station's 104 resources (i.e., no additional spatial streams are available at the subscriber station 104), the subscriber station 104 may suspend contention until after the SDMA TXOP 664. This will prevent the subscriber station 104 being allocated two transmissions during the same SDMA TXOP 664, which is not possible. Alternatively, if contention is not suspended after a successful request, the access point 102 may register any duplicate requests and schedule the according uplink SDMA transmissions in subsequent uplink SDMA TXOPs.

During the SDMA TXOP 664, the subscriber stations 104 with allocated resources may transmit 614, 616, 618 according to those allocated resources. The access point 102 may then send BA frames 624, 626, 628 to the subscriber stations 104.

Figure 7:
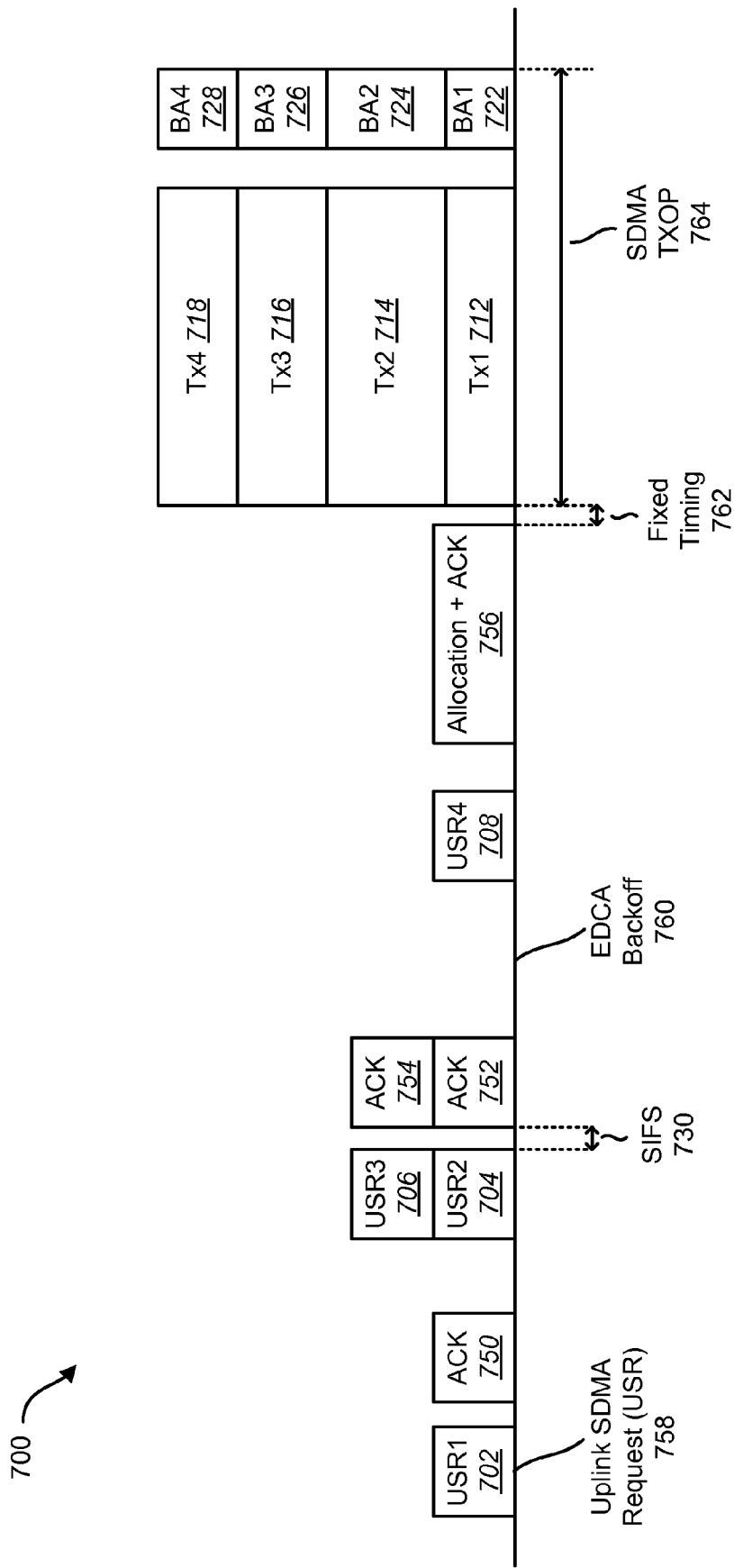
FIG. 7 illustrates a system for an uplink SDMA transmission scheme with parallel request capability.

FIG. 7 illustrates a system 700 for an uplink SDMA transmission scheme with parallel request capability. The access point 102 may receive USRs 758 and transmit ACKs 750. In the Figure, USR1 702 is received by the access point 102. The access point 102 may wait an SIFS 730 before sending an ACK 750. Multiple USRs 704, 706 may be received in parallel without causing a collision if the USRs 704, 706 have different spatial streams. The spatial streams may be randomly selected. When multiple USRs 704, 706 may be received in parallel, the contention window may be smaller. However, the USRs 704, 706 may become longer because multiple spatial stream training fields need to be present. After a SIFS 730, the access point 102 may transmit an ACK 752, 754 to the senders of the parallel USRs 704, 706. Subscriber stations 104 with parallel request capability and subscriber stations 104 without parallel request capability may be mixed. After receiving a final USR 708, the access point 102 may send a final ACK 756. The final ACK 756 may include an allocation frame. A fixed timing 762 may occur before the start of the SDMA TXOP 764 in which multiple subscriber stations 104 transmit 712, 714, 716, 718 data to the access point 102. During the SDMA TXOP 764, the access point 102 may also transmit a block ACK 722, 724, 726, 728 to the subscriber stations 104. Parallel USRs 704, 706 may also be transmitted in parallel using different channels or different sub-channels (OFDMA). The (sub-) channel may be selected randomly.

Figure 8:
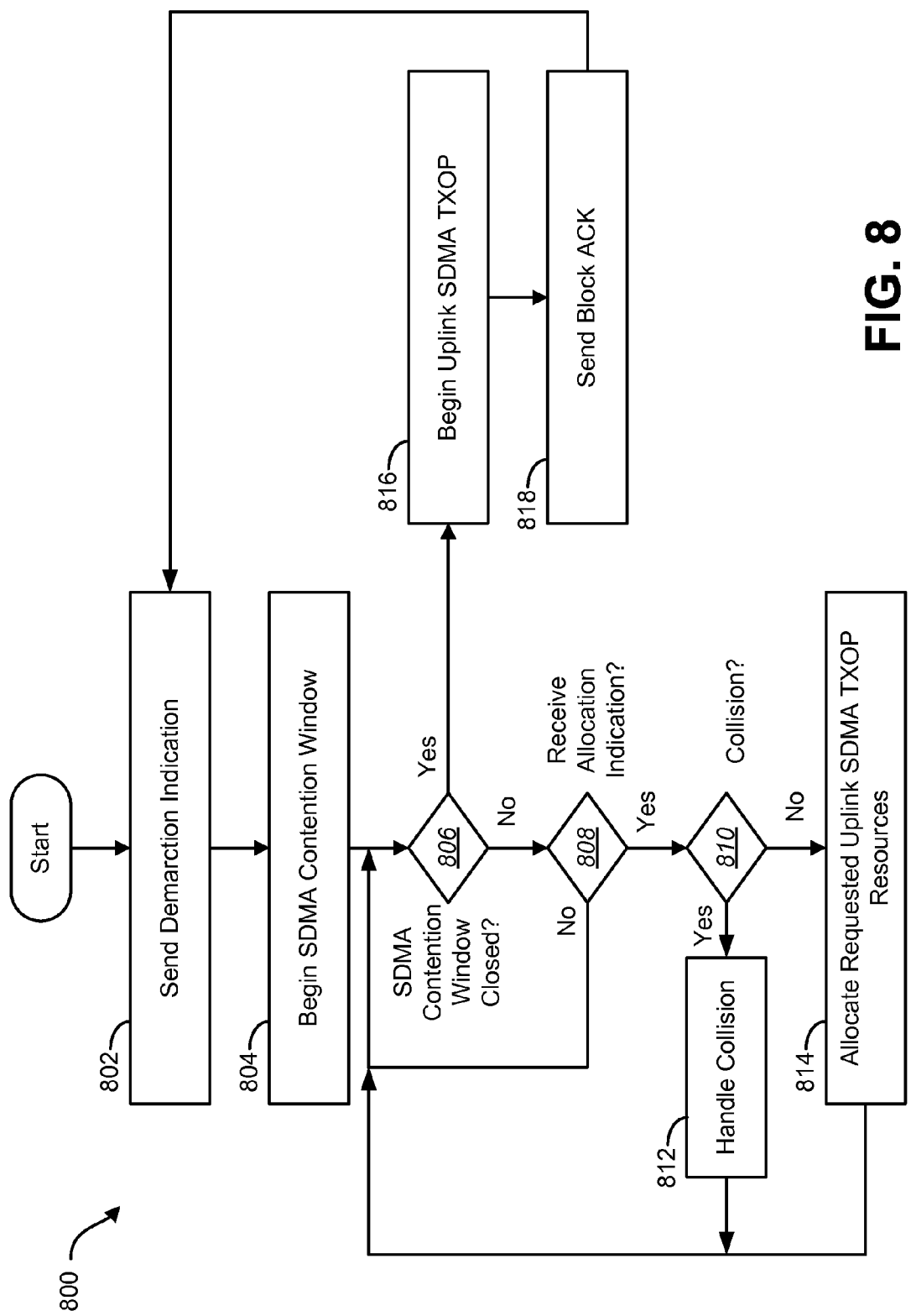
FIG. 8 is a flow diagram illustrating a method for a separate contention window allowing allocations for a pending uplink SDMA TXOP.

FIG. 8 is a flow diagram illustrating a method 800 for a separate contention window 210 allowing allocations for a pending uplink SDMA TXOP 212. The access point 102 may send 802 a demarcation indication 202 to the subscriber stations 104. The access point 102 may then begin 804 the SDMA contention window 210. The access point 102 may then determine 806 whether the SDMA contention window 210 has closed. If the SDMA contention window 210 has not closed, the access point 102 may determine 808 whether the access point 102 has received an allocation indication. If the access point 102 has not received an allocation indication, the access point 102 may return to determining 806 whether the SDMA contention window 210 has closed. If the access point 102 has received an allocation indication, the access point 102 may then determine 810 whether a collision has occurred.

If a collision has occurred, the access point 102 may handle 812 the collision. As discussed above, the access point 102 may handle 812 the collision in many ways such as restarting the contention window 210, deciphering the collided allocation indications, or denying the allocation indications and continuing the same contention window 210. Once the access point 102 has handled the collision, the access point 102 may return to determining 806 whether the SDMA contention window 210 has closed.

If the access point 102 has received an allocation indication and a collision has not occurred, the access point 102 may allocate 814 the requested uplink SDMA TXOP 212 resources to the subscriber station 104. The access point 102 may then return to determining 806 whether the SDMA contention window 210 has closed.

If the SDMA contention window 210 has closed, the access point 102 may begin 816 the uplink SDMA TXOP 212. Upon completion of the uplink SDMA TXOP 212, the access point 102 may send 818 a block ACK 236 to the subscriber stations 104. The access point 102 may then send 802 a demarcation indication 202 to the subscriber stations 104.

Figure 8A:
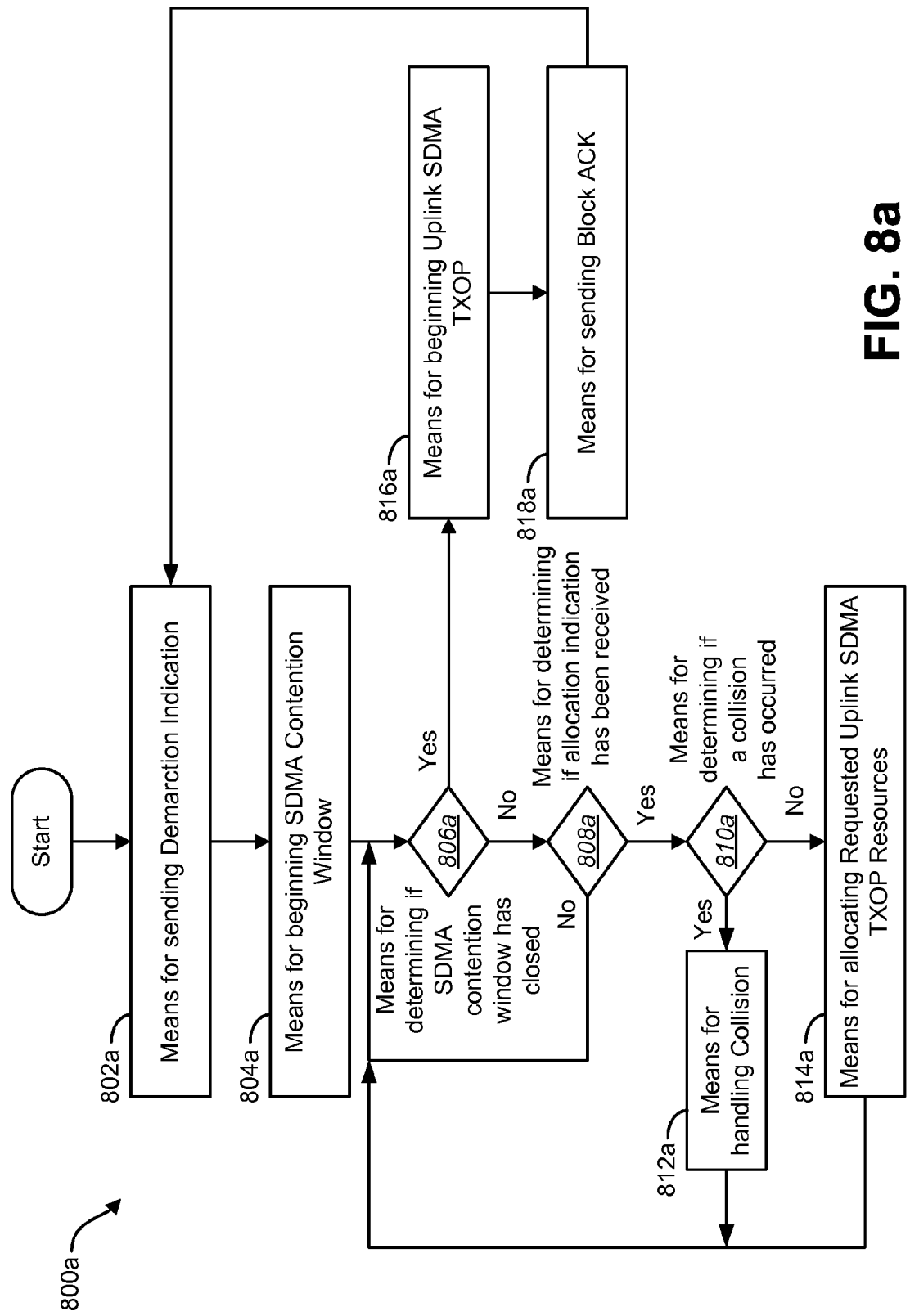
FIG. 8a illustrates means-plus-function blocks corresponding to the method of FIG. 8.

The method 800 of FIG. 8 described above may be performed by various hardware and/or software component(s) and/or module(s) corresponding to the means-plus-function blocks 800a illustrated in FIG. 8a. In other words, blocks 802 through 818 illustrated in FIG. 8 correspond to means-plus-function blocks 802a through 818a illustrated in FIG. 8a.

Figure 9:
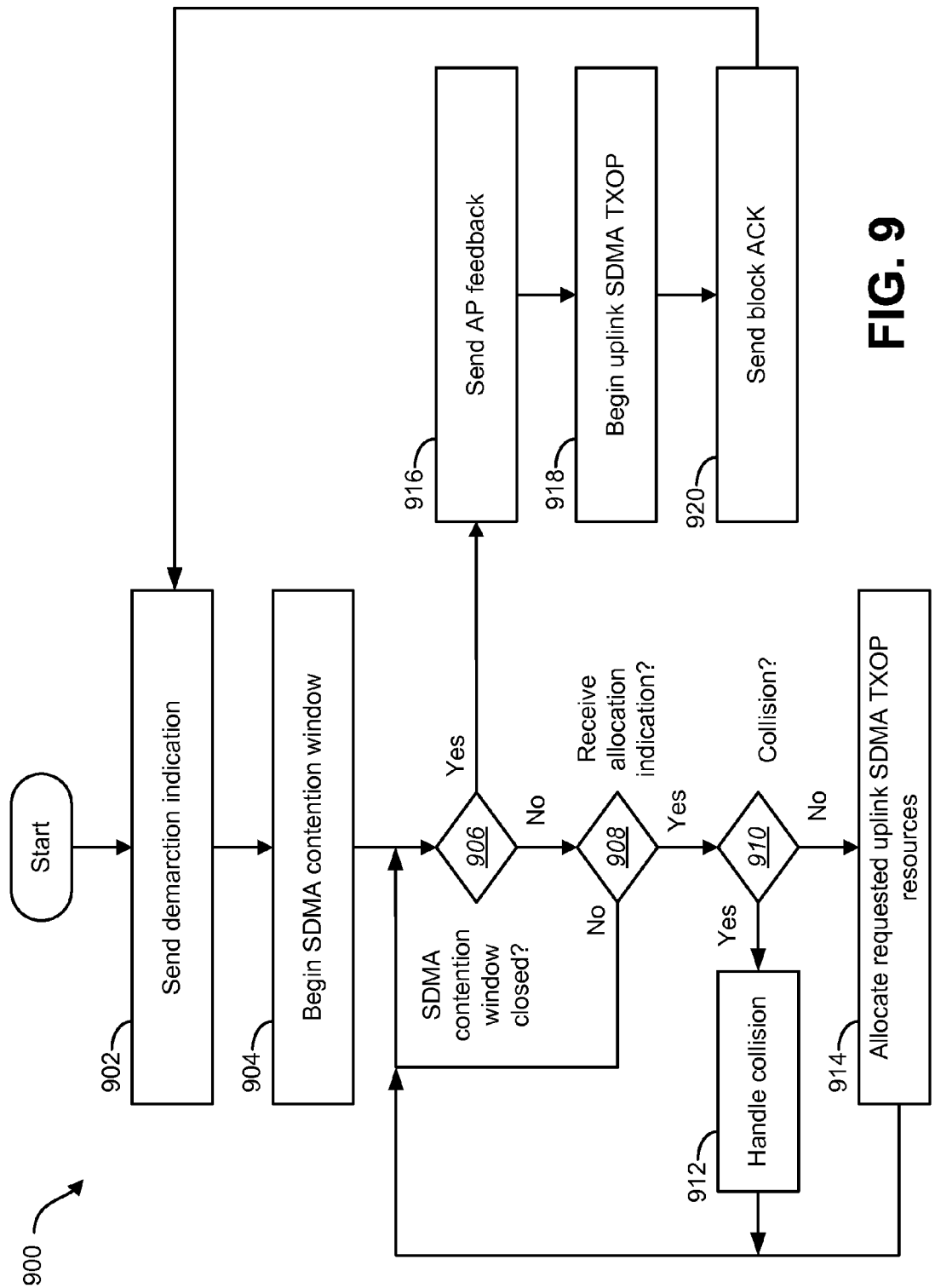
FIG. 9 is a flow diagram illustrating a method for a separate contention window allowing allocations for a pending uplink SDMA TXOP with access feedback at the end of the contention window.

FIG. 9 is a flow diagram illustrating a method 900 for a separate contention window 310 allowing allocations for a pending uplink SDMA TXOP 312 with access point feedback 340 at the end of the contention window 310. The access point 102 may send 902 a demarcation indication 302 to the subscriber stations 104. The access point 102 may then begin 904 the SDMA contention window 310. The access point 102 may then determine 906 whether the SDMA contention window 310 has closed. If the SDMA contention window 310 has not closed, the access point 102 may determine 908 whether the access point 102 has received an allocation indication. If the access point 102 has not received an allocation indication, the access point 102 may return to determining 906 whether the SDMA contention window 310 has closed. If the access point 102 has received an allocation indication, the access point 102 may then determine 910 whether a collision has occurred.

If a collision has occurred, the access point 102 may handle 912 the collision. Once the access point 102 has handled 912 the collision, the access point 102 may return to determining 906 whether the SDMA contention window 310 has closed.

If the access point 102 has received an allocation indication and a collision has not occurred, the access point 102 may allocate 914 the requested uplink SDMA TXOP 312 resources to the subscriber station 104. The access point 102 may then return to determining 906 whether the SDMA contention window 310 has closed.

If the SDMA contention window 310 has closed, the access point 102 may send 916 access point feedback 340 to the subscriber stations 104. The access point 102 may then begin 918 the uplink SDMA TXOP 312. Upon completion of the uplink SDMA TXOP 312, the access point 102 may send 920 a block ACK 336 to the subscriber stations 104. The access point 102 may then send 902 a demarcation indication 302 to the subscriber stations 104.

Figure 9A:
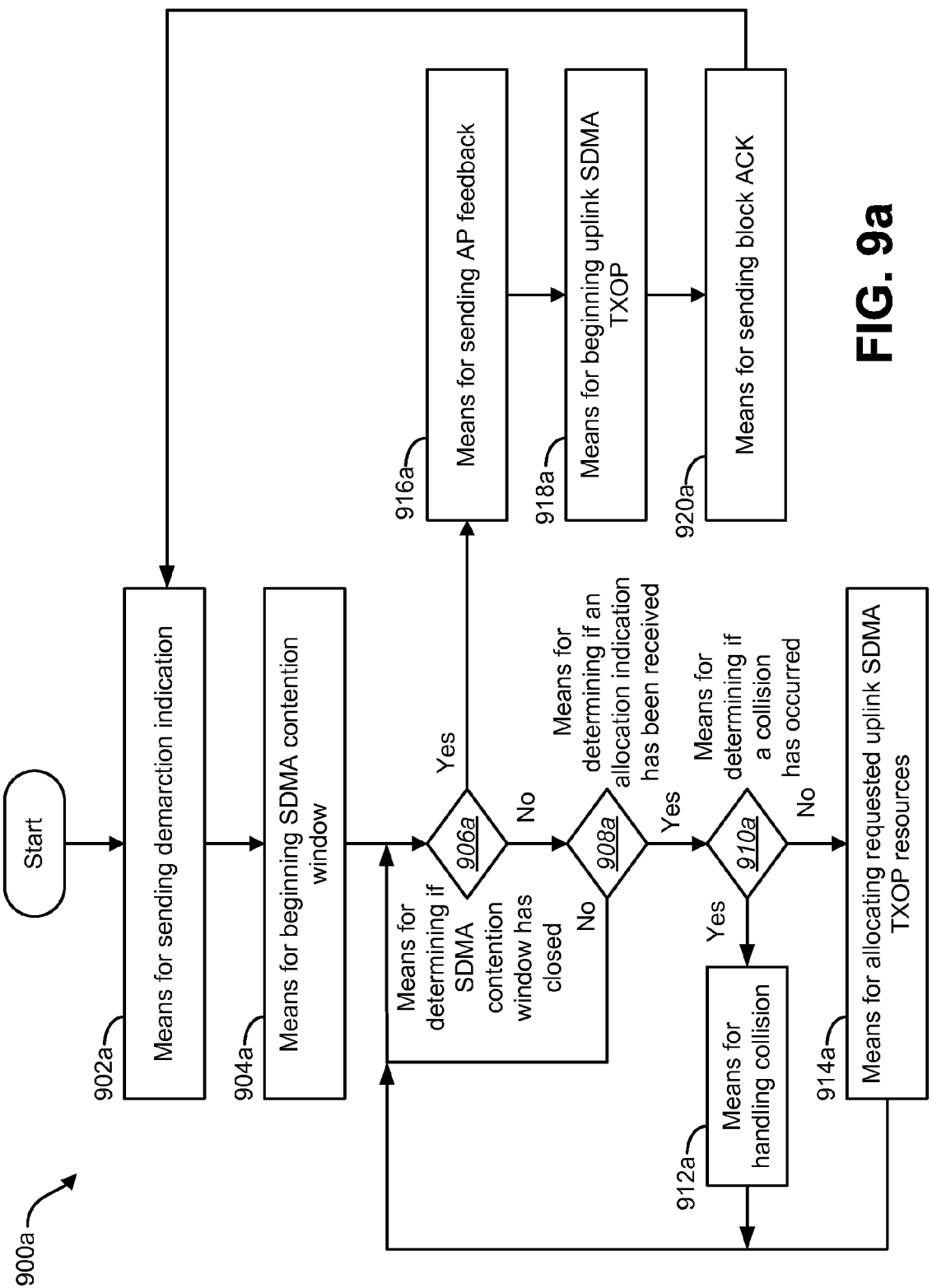
FIG. 9a illustrates means-plus-function blocks corresponding to the method of FIG. 9.

The method 900 of FIG. 9 described above may be performed by various hardware and/or software component(s) and/or module(s) corresponding to the means-plus-function blocks 900a illustrated in FIG. 9a. In other words, blocks 902 through 920 illustrated in FIG. 9 correspond to means-plus-function blocks 902a through 920a illustrated in FIG. 9a.

Figure 10:
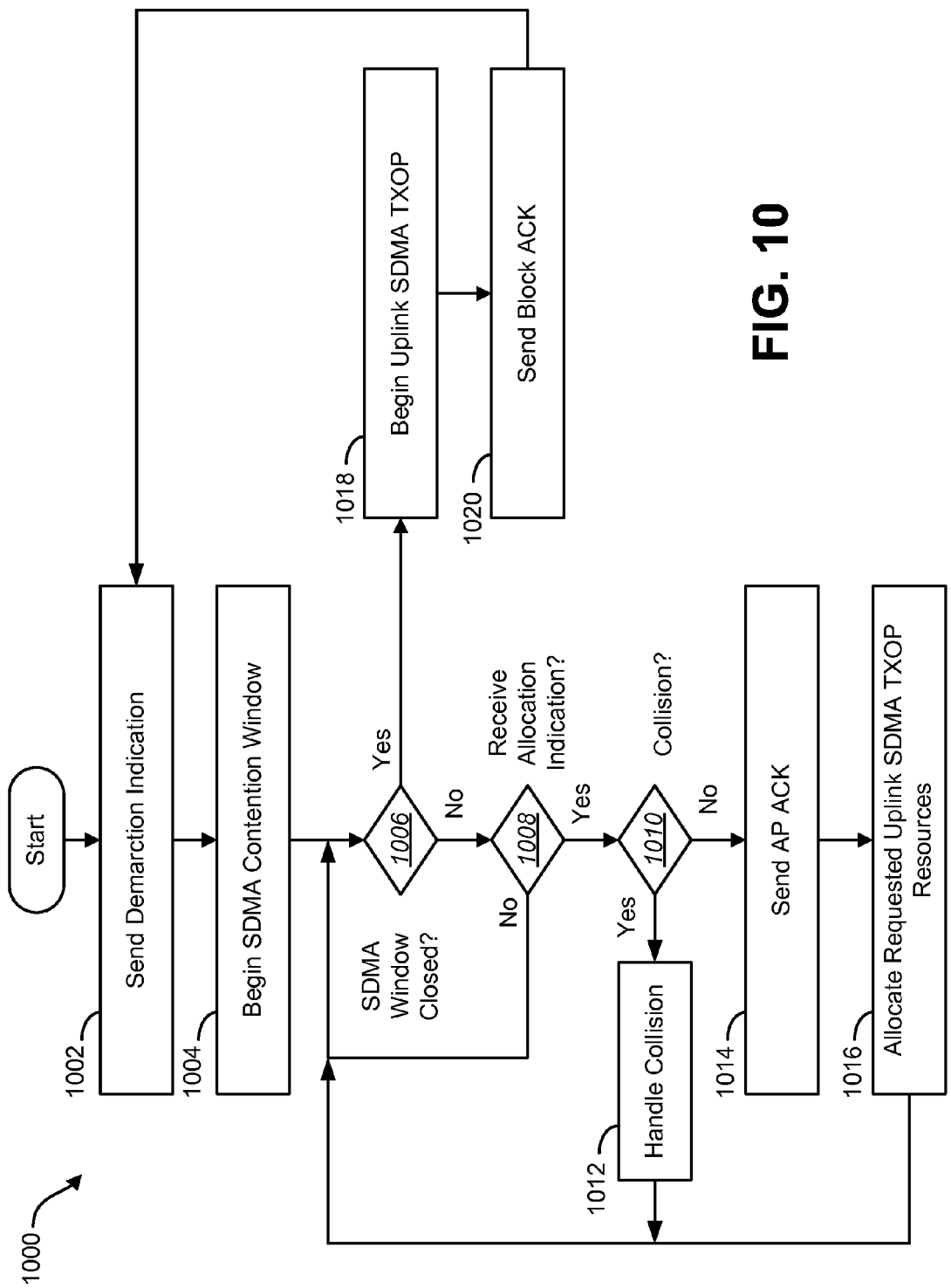
FIG. 10 is a flow diagram illustrating a method for a separate contention window allowing allocations for a pending uplink SDMA TXOP with acknowledgement after the reception of allocation indications.

FIG. 10 is a flow diagram illustrating a method 1000 for a separate contention window 410 allowing allocations for a pending uplink SDMA TXOP 412 with acknowledgement after the reception of allocation indications. The access point 102 may send 1002 a demarcation indication 402 to the subscriber stations 104. The access point 102 may then begin 1004 the SDMA contention window 410. The access point 102 may then determine 1006 whether the SDMA contention window 410 has closed. If the SDMA contention window 410 has not closed, the access point 102 may determine 1008 whether the access point 102 has received an allocation indication. If the access point 102 has not received an allocation indication, the access point 102 may return to determining 1006 whether the SDMA contention window 410 has closed. If the access point 102 has received an allocation indication, the access point 102 may then determine 1010 whether a collision has occurred.

If a collision has occurred, the access point 102 may handle 1012 the collision. Once the access point 102 has handled 1012 the collision, the access point 102 may return to determining 1006 whether the SDMA contention window 410 has closed.

If the access point 102 has received an allocation indication and a collision has not occurred, the access point 102 may send 1014 an access point acknowledgment (AP ACK) to the subscriber stations 104. The access point 102 may then allocate 1016 the requested uplink SDMA TXOP 412 resources to the subscriber station 104. The access point 102 may then return to determining 1006 whether the SDMA contention window 410 has closed.

If the SDMA contention window 410 has closed, the access point 102 may begin 1018 the uplink SDMA TXOP 412. Upon completion of the uplink SDMA TXOP 412, the access point 102 may send 1020 a block ACK 436 to the subscriber stations 104. The access point 102 may then send 1002 a demarcation indication 402 to the subscriber stations 104.

Figure 10A:
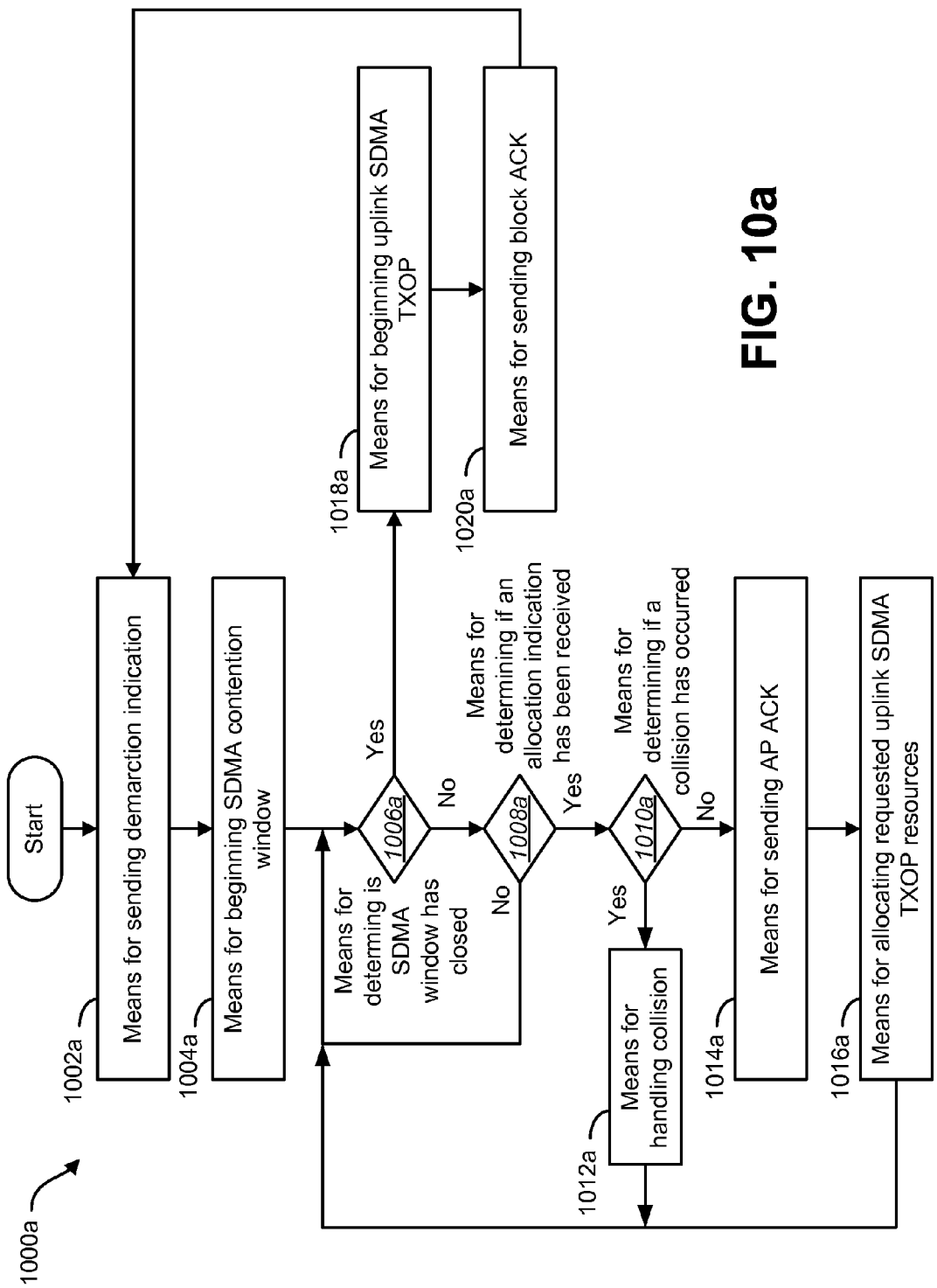
FIG. 10a illustrates means-plus-function blocks corresponding to the method of FIG. 10.

The method 1000 of FIG. 10 described above may be performed by various hardware and/or software component(s) and/or module(s) corresponding to the means-plus-function blocks 1000a illustrated in FIG. 10a. In other words, blocks 1002 through 1020 illustrated in FIG. 10 correspond to means-plus-function blocks 1002a through 1020a illustrated in FIG. 10a.

Figure 11:
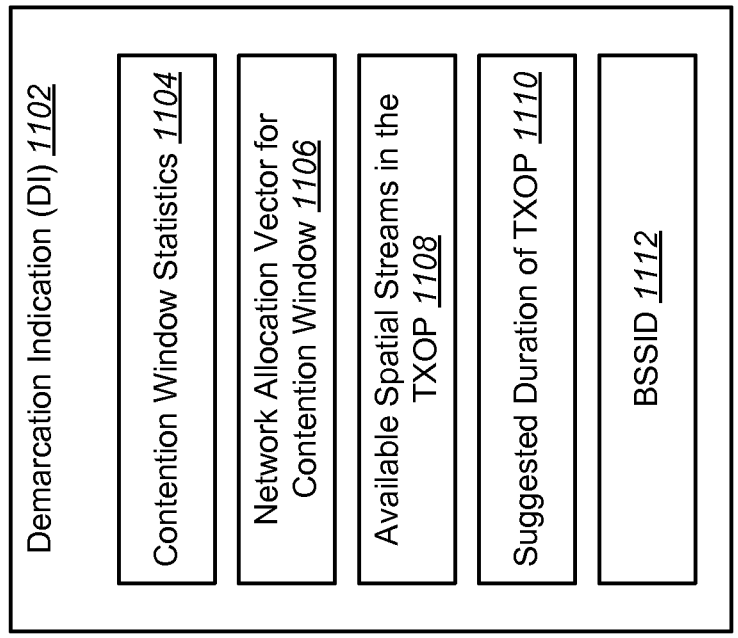
FIG. 11 is a block diagram illustrating the various components of a demarcation indication.

FIG. 11 is a block diagram illustrating the various components of a demarcation indication 1102. The demarcation indication 1102 may include contention window statistics 1104 such as the length of the SDMA contention window, the minimum and maximum contention window lengths, the AIFS, and the Tx probabilities.

The demarcation indication 1102 may also include a network allocation vector (NAV) 1106 for the contention window. The NAV 1106 may indicate how long a subscriber station 104 should defer from accessing the media. Furthermore, the demarcation indication 1102 may include the available number of streams 1108 in the TXOP and the suggested duration 1110 of the TXOP. Finally, the demarcation indication 1102 may include the BSSID 1112. The BSSID 1112 may prevent subscriber stations 104 from overlapping networks to contend for the pending SDMA TXOP. In general, subscriber stations 104 should only contend for uplink SDMA access for MPDUs with a receiver address (RA) equal to the BSSID 1112. The demarcation indication 1102 may include a variety of information not discussed above. The demarcation indication 1102 may be a regular 802.11 MPDU.

Figure 12:
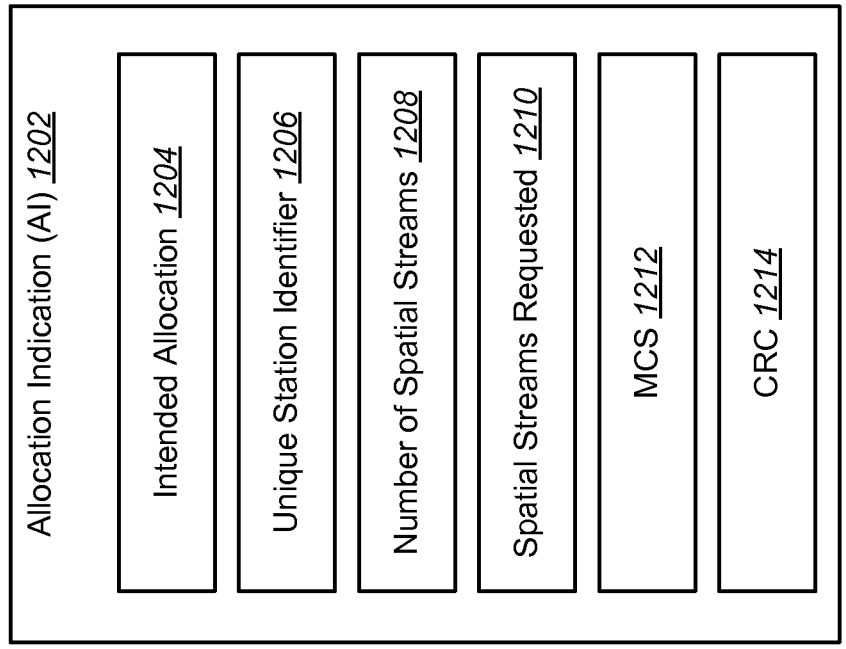
FIG. 12 is a block diagram illustrating the various components of an allocation indication.

FIG. 12 is a block diagram illustrating the various components of an allocation indication 1202. The allocation indication 1202 may include information such as the intended allocation 1204, the unique station identifier 1206 (within the BSS), the number of spatial streams 1208, the specific spatial streams requested 1210, the modulation coding scheme (MCS) 1212, and a cyclic redundancy check (CRC) 1214. The allocation indication 1202 transmission is assumed to be a short transmission. The allocation indication 1202 transmission may be much shorter than a typical WLAN frame. For example, the allocation indication 1202 transmission may be in the order of 1 symbol with a time of 4 microseconds. The allocation indication 1202 may also be a regular MAC transmission such as a control frame, a management action frame, or anything in between.

Rather than being a simple signal containing only a few subcarriers, the allocation indication 1202 may also contain data. One advantage of this is that the data can include a cyclic redundancy check (CRC) 1214, which makes it possible to detect collisions with high reliability. To keep the allocation indication 1202 data signal as short as possible, it is important that the data can be decoded without requiring a lot of training-like symbol timing and channel estimation. One possible allocation indication 1202 signal design that satisfies this requirement is to transmit one orthogonal frequency division multiplexing (OFDM) symbol with binary phase shift keying (BPSK) or quadrature phase shift keying (QPSK) modulation where the data is differentially encoded across subcarriers and that include a few (4 or 6) pilot subcarriers with a known BPSK or QPSK phase. The guard time of the allocation indication 1202 OFDM symbol may be made large such that the symbol duration fills the entire slot.

A receiver can decode such a symbol by performing the following steps: 1) settle the automatic gain control (AGC) at the start of slot, 2) take a Fast Fourier Transform (FFT) on M samples, 3) estimate a linear phase slope across the pilot subcarriers and correct all data subcarriers for this linear phase slope, 4) do differential phase detection across subcarriers, i.e., multiply the complex sample of subcarrier i by the conjugated value of subcarrier i−1, with the first subcarrier i=0 being used as the initial reference value, 5) perform BPSK or QPSK slicing, and 6) do a CRC 1214 check and interpret the data content. Instead of being just one OFDM symbol, the allocation indication 1202 may also consist of multiple OFDM symbols. This may have a disadvantage, in that the receiver needs to do symbol timing within an allocation indication 1202 slot to determine the boundary between different allocation indication 1202 symbols.

The purpose of the allocation indication 1202 signal is to signal a number that is mapped onto a specific SDMA spatial stream, multiple spatial streams, or onto a certain orthogonal frequency division multiple access (OFDMA) configuration after the contention period. This means the set of available allocation indication 1202 signals should be at least as large as the total number of SDMA and/or OFDMA configurations. There is a benefit of having an allocation indication 1202 set size larger than the total number of configurations, as this makes it possible to detect or reduce collisions. In the case of unscheduled access, there is a fixed mapping from the allocation indication 1202 number to the SDMA/OFDMA configuration. If there are multiple allocation indication 1202 numbers available for each configuration, then it is possible for an access point 102 or subscriber stations 104 to see that there is going to be a collision if they hear multiple allocation indications 1202 that point to the same configuration. This collision detection capability may be used to transmit a collision indication as was described earlier. For example, the subscriber station 104 could transmit a collision indication.

In the case of scheduled access, the access point 102 may select a group of allocation indication 1202 values that were received during the contention period and map this onto SDMA/OFDMA configurations. In this way, the probability of collisions is reduced to the probability that two subscriber stations 104 started transmitting the same allocation indication 1202 in the same slot.

The allocation indication 1202 signal may be short enough to fit within a slot. There should be a certain number of different allocation indication 1202 signals with zero or low cross-correlation such that an access point 102 or subscriber station 104 can detect the presence of multiple allocation indication 1202 signals in a slot. This should be done in the presence of noise and multipath propagation. Detection of an allocation indication 1202 should be as simple as possible, as there is no time for extensive preamble training.

One possible choice for the allocation indication 1202 signal set is to use an OFDMA based set of K-out-of-N subcarriers, where N is the maximum number of OFDM subcarriers and K<N is the number of subcarriers used by each allocation indication 1202. For example, consider the case of an 802.11n 40 MHz channel with N=114 subcarriers. One possible allocation indication 1202 signal set for this case would be to choose K=3 such that there are 38 possible allocation indication 1202 signals, where allocation indication 1202 signal number i transmits on subcarriers (38n+i) mod(114), where n={0, 1, 2} and i={0, 1, . . . , 37}. Thus, allocation indication 1202 number 0 transmits on subcarriers {0, 38, 76}. In general, allocation indication 1202 signal number i transmits on subcarriers (Nn/K+i)modN. The interleaving of the K tones is done to make the allocation indication 1202 signal more robust to frequency fading. Choosing a larger K value also helps to make the allocation indication 1202 signals more robust to frequency fading, at the cost of reducing the total number of available signals.

To receive the allocation indication 1202 signals, each subscriber station 104 should set the subscriber station's 104 AGC at the start of each slot, which may take 1 to 2 microseconds depending on the implementation. After this gain setting, a minimum of M samples should be collected, where M is the closest power of two larger than N. For instance, for N=114, M=128. The receiver then performs an FFT on the M samples and determines which subcarriers are used or not. To determine whether a certain allocation indication 1202 is present or not, the receiver sums K subcarrier powers for all possible allocation indication 1202 signals and compares the power values to the estimated noise power level multiplied by some detection threshold.

Figure 13:
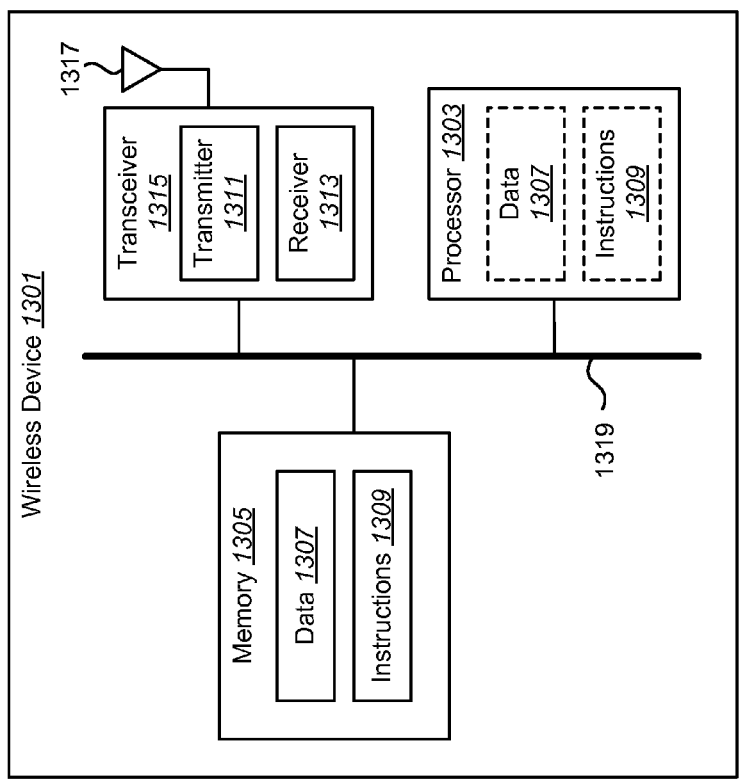
FIG. 13 illustrates various components that may be utilized in a wireless device.

FIG. 13 illustrates certain components that may be included within a wireless device 1301. The wireless device 1301 may be a subscriber station 104 or an access point 102.

The wireless device 1301 includes a processor 1303. The processor 1303 may be a general purpose single- or multi-chip microprocessor (e.g., an ARM), a special purpose microprocessor (e.g., a digital signal processor (DSP)), a microcontroller, a programmable gate array, etc. The processor 1303 may be referred to as a central processing unit (CPU). Although just a single processor 1303 is shown in the wireless device 1301 of FIG. 13, in an alternative configuration, a combination of processors (e.g., an ARM and DSP) could be used.

The wireless device 1301 also includes memory 1305. The memory 1305 may be any electronic component capable of storing electronic information. The memory 1305 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1307 and instructions 1309 may be stored in the memory 1305. The instructions 1309 may be executable by the processor 1303 to implement the methods disclosed herein. Executing the instructions 1309 may involve the use of the data 1307 that is stored in the memory 1305.

The wireless device 1301 may also include a transmitter 1311 and a receiver 1313 to allow transmission and reception of signals between the wireless device 1301 and a remote location. The transmitter 1311 and receiver 1313 may be collectively referred to as a transceiver 1315. An antenna 1317 may be electrically coupled to the transceiver 1315. The wireless device 1301 may also include (not shown) multiple transmitters, multiple receivers, multiple transceivers and/or multiple antenna.

The various components of the wireless device 1301 may be coupled together by one or more buses, which may include a power bus, a control signal bus, a status signal bus, a data bus, etc. For the sake of clarity, the various buses are illustrated in FIG. 13 as a bus system 1319.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal subcarriers. These subcarriers may also be called tones, bins, etc. With OFDM, each subcarrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent subcarriers, or enhanced FDMA (EFDMA) to transmit on multiple blocks of adjacent subcarriers. In general, modulation symbols are sent in the frequency domain with OFDM and in the time domain with SC-FDMA.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 8, 9 and 10, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for providing uplink spatial division multiple access (SDMA) transmission opportunities (TXOP), the method being implemented by a wireless device, the method comprising:
    sending a demarcation indication to one or more subscriber stations;
    beginning an SDMA contention window;
    receiving an allocation indication; and
    allocating requested uplink SDMA TXOP resources according to the allocation indication, wherein uplink transmissions during an uplink SDMA TXOP start at the same time, and wherein the uplink SDMA TXOP begins a fixed offset after the transmission of the demarcation indication by the wireless device.

2. The method of claim 1, further comprising handling collisions during the SDMA contention window.

3. The method of claim 1, further comprising beginning an uplink SDMA TXOP after the end of the SDMA contention window.

4. The method of claim 3, further comprising sending a block ACK to the subscriber stations.

5. The method of claim 1, further comprising sending feedback to the subscriber stations after the end of the SDMA contention window.

6. The method of claim 5, further comprising beginning an uplink SDMA TXOP after the feedback has been sent to the subscriber stations.

7. The method of claim 5, wherein the feedback includes an allocation of an SDMA TXOP.

8. The method of claim 1, further comprising sending an ACK after receiving the allocation indication.

9. The method of claim 1, wherein the wireless device supports an Institute of Electronic and Electrical Engineers (IEEE) 802.11 standard.

10. The method of claim 1, wherein the demarcation indication triggers the start of the SDMA contention window.

11. The method of claim 1, wherein the SDMA contention window has a fixed length.

12. The method of claim 1, further comprising restarting the SDMA contention window if a collision between allocation indications is detected.

13. The method of claim 1, further comprising reassigning a colliding request to another portion of the uplink SDMA TXOP when a collision between allocation indications is detected.

14. The method of claim 1, further comprising sending a collision signal that prompts colliding subscriber stations to contend again when a collision between allocation indications is detected.

15. A wireless device that is configured for providing uplink spatial division multiple access (SDMA) transmission opportunities (TXOP), comprising:
    a processor; and
    circuitry coupled to said processor configured to:
        send a demarcation indication to one or more subscriber stations;
        begin an SDMA contention window;
        receive an allocation indication; and
        allocate requested uplink SDMA TXOP resources according to the allocation indication, wherein uplink transmissions during an uplink SDMA TXOP start at the same time, and wherein the uplink SDMA TXOP begins a fixed offset after the transmission of the demarcation indication by the wireless device.

16. The wireless device of claim 15, wherein the circuitry is further configured to handle collisions during the SDMA contention window.

17. The wireless device of claim 15, wherein the circuitry is further configured to begin an uplink SDMA TXOP after the end of the SDMA contention window.

18. The wireless device of claim 17, wherein the circuitry is further configured to send a block ACK to the subscriber stations.

19. The wireless device of claim 15, wherein the circuitry is further configured to send feedback to the subscriber stations after the end of the SDMA contention window.

20. The wireless device of claim 19, wherein the circuitry is further configured to begin an uplink SDMA TXOP after the feedback has been sent to the subscriber stations.

21. The wireless device of claim 19, wherein the feedback includes an allocation of an SDMA TXOP.

22. The wireless device of claim 15, wherein the circuitry is further configured to send an ACK after receiving an allocation indication.

23. The wireless device of claim 15, wherein the wireless device supports an Institute of Electronic and Electrical Engineers (IEEE) 802.11 standard.

24. An apparatus that is configured for providing uplink spatial division multiple access (SDMA) transmission opportunities (TXOP), comprising:
    means for sending a demarcation indication to one or more subscriber stations;
    means for beginning an SDMA contention window;
    means for receiving an allocation indication; and
    means for allocating requested uplink SDMA TXOP resources according to the allocation indication, wherein uplink transmissions during an uplink SDMA TXOP start at the same time, and wherein the uplink SDMA TXOP begins a fixed offset after the transmission of the demarcation indication.

25. A computer-program product for providing uplink spatial division multiple access (SDMA) transmission opportunities (TXOP) by a wireless device, the computer-program product stored on a non-transitory computer-readable medium having instructions thereon, the instructions comprising:
    code for sending a demarcation indication to one or more subscriber stations;
    code for beginning an SDMA contention window;
    code for receiving an allocation indication; and
    code for allocating requested uplink SDMA TXOP resources according to the allocation indication, wherein uplink transmissions during an uplink SDMA TXOP start at the same time, and wherein the uplink SDMA TXOP begins a fixed offset after the transmission of the demarcation indication.

26. A method for providing uplink spatial division multiple access (SDMA) transmission opportunities (TXOP) by a wireless device, the method comprising:
  receiving an allocation indication; and
  allocating requested uplink SDMA TXOP resources according to the allocation indication, wherein uplink transmissions during an uplink SDMA TXOP start at the same time, and wherein the uplink SDMA TXOP begins a fixed offset after the transmission of a demarcation indication by the wireless device.

27. A wireless device that is configured for providing uplink spatial division multiple access (SDMA) transmission opportunities (TXOP), comprising:
  a processor; and
  circuitry coupled to said processor configured to:
    receive an allocation indication; and
    allocate requested uplink SDMA TXOP resources according to the allocation indication, wherein uplink transmissions during an uplink SDMA TXOP start at the same time, and wherein the uplink SDMA TXOP begins a fixed offset after the transmission of a demarcation indication by the wireless device.

28. An apparatus that is configured for providing uplink spatial division multiple access (SDMA) transmission opportunities (TXOP), comprising:
  means for receiving an allocation indication; and
  means for allocating requested uplink SDMA TXOP resources according to the allocation indication, wherein uplink transmissions during an uplink SDMA TXOP start at the same time, and wherein the uplink SDMA TXOP begins a fixed offset after the transmission of a demarcation indication by the apparatus.

29. A computer-program product for providing uplink spatial division multiple access (SDMA) transmission opportunities (TXOP) by a wireless device, the computer-program product stored on a non-transitory computer-readable medium having instructions thereon, the instructions comprising:
  code for receiving an allocation indication; and
  code for allocating requested uplink SDMA TXOP resources according to the allocation indication, wherein uplink transmissions during an uplink SDMA TXOP start at the same time, and wherein the uplink SDMA TXOP begins a fixed offset after the transmission of a demarcation indication by the wireless device.

30. A method for providing uplink spatial division multiple access (SDMA) transmission opportunities (TXOP), the method being implemented by a wireless device, the method comprising:
  receiving an uplink SDMA request (USR), wherein multiple USRs can be received in parallel without causing a collision if the USRs have different spatial streams;
  allocating requested uplink SDMA TXOP resources according to the USR, wherein uplink transmissions during an uplink SDMA TXOP start at the same time; and
  sending an ACK frame in response to the USR frame, wherein the uplink SDMA TXOP begins a fixed offset after the transmission of a demarcation indication by the wireless device.

31. The method of claim 30, further comprising beginning an uplink SDMA TXOP when sufficient resources have been allocated.

32. The method of claim 30, further comprising beginning an uplink SDMA TXOP when sufficient time has expired.

33. The method of claim 30, further comprising beginning an uplink SDMA TXOP by sending an allocation frame.

34. The method of claim 30, further comprising beginning an uplink SDMA TXOP by aggregating an allocation frame to the ACK frame.

35. The method of claim 30, further comprising beginning an uplink SDMA TXOP by sending an allocation frame a short inter-frame space (SIFS) after sending an ACK frame.

36. The method of claim 30, wherein the USR frame is an RTS frame and the ACK frame is a CTS frame.

37. A method for providing uplink spatial division multiple access (SDMA) transmission opportunities (TXOP), the method being implemented by a wireless device, the method comprising:
  transmitting an uplink SDMA request (USR), wherein a spatial stream of the USR is randomly selected;
  receiving an ACK frame in response to the USR frame;
  receiving an allocation frame; and
  transmitting uplink data according to the allocation frame, wherein uplink transmissions during an uplink SDMA TXOP start at the same time, wherein the uplink SDMA TXOP begins a fixed offset after the transmission of a demarcation indication.

38. The method of claim 37, further comprising halting a backoff when an ACK was received in response to a USR frame.

39. The method of claim 38, further comprising resuming a backoff after an uplink SDMA TXOP has occurred.

40. The method of claim 37, further comprising resuming a backoff after a USR frame was transmitted.

* * * * *